(12) United States Patent
Matsuo et al.

(10) Patent No.: US 6,628,590 B1
(45) Date of Patent: Sep. 30, 2003

(54) CARRYING DEVICE FOR INFORMATION RECORDING MEDIUM

(75) Inventors: Kazunori Matsuo, Saitama-ken (JP); Teruo Takahashi, Saitama-ken (JP); Susumu Yoshida, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/433,956

(22) Filed: Nov. 4, 1999

(30) Foreign Application Priority Data

Nov. 9, 1998 (JP) .......................................... 10-317545

(51) Int. Cl.⁷ ................................................ G11B 7/00
(52) U.S. Cl. ................................... 369/53.2; 369/53.37
(58) Field of Search .................. 369/53.2, 53.21–53.22, 369/53.37, 75.1–75.2

(56) References Cited

U.S. PATENT DOCUMENTS 5,023,854 A * 6/1991 Satoh et al.
5,056,075 A * 10/1991 Maruta et al. ........... 369/44.29
5,070,418 A * 12/1991 Takahashi
5,317,553 A * 5/1994 Ohga et al.
5,392,269 A * 2/1995 Horie
5,745,451 A * 4/1998 Mukawa et al. ......... 369/44.29
5,768,222 A * 6/1998 Hisamatsu et al.

* cited by examiner

Primary Examiner—W. R. Young
(74) Attorney, Agent, or Firm—Arent Fox Kintner Plotkin & Kahn

(57) ABSTRACT

An information recording-reproducing apparatus includes carrier rollers arranged in a carriage path having a width almost equal to a diameter of a large diameter disc, and a mechanical side switch PSW at one peripheral end of the carriage path. First and second optical detectors are arranged in the carriage path at an interval smaller than a diameter of the small diameter disc. The first optical detector and the side switch are arranged at an interval larger than the diameter of the small diameter disc, while the second optical detector and the side switch are arranged at an interval smaller than the diameter of the small diameter disc. The type of the disc as well as difference between the disc and an object other than the disc are determined based on the detection signals from the optical detectors and the side switch.

10 Claims, 17 Drawing Sheets

FIG.5 c
|  | CLOSE | OPEN |
|---|---|---|
| SP1 | H | L |
| SP2 | H | L |
FIG.5 f
|  | OFF | ON |
|---|---|---|
| SPSW | H | L |
| SHSW | H | L |
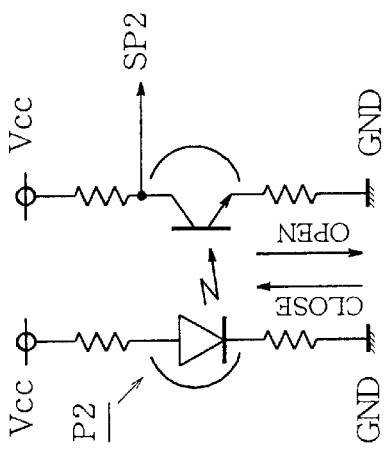
FIG.5 a
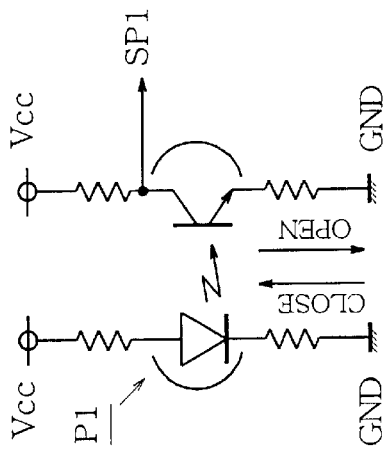
FIG.5 b
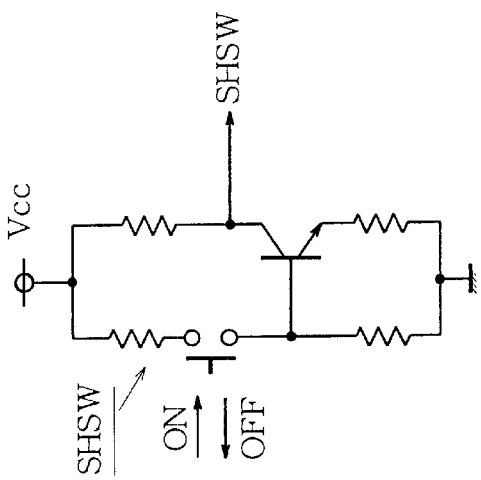
FIG.5 d
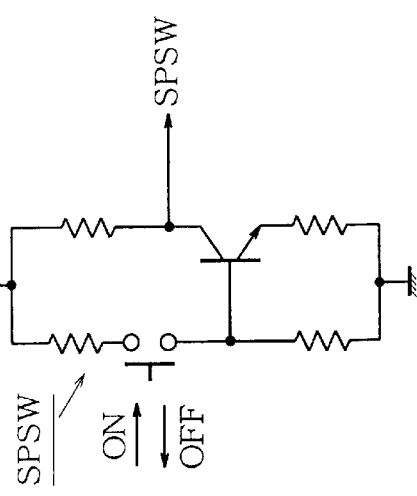
FIG.5 e 12-cm DIAMETER DISC

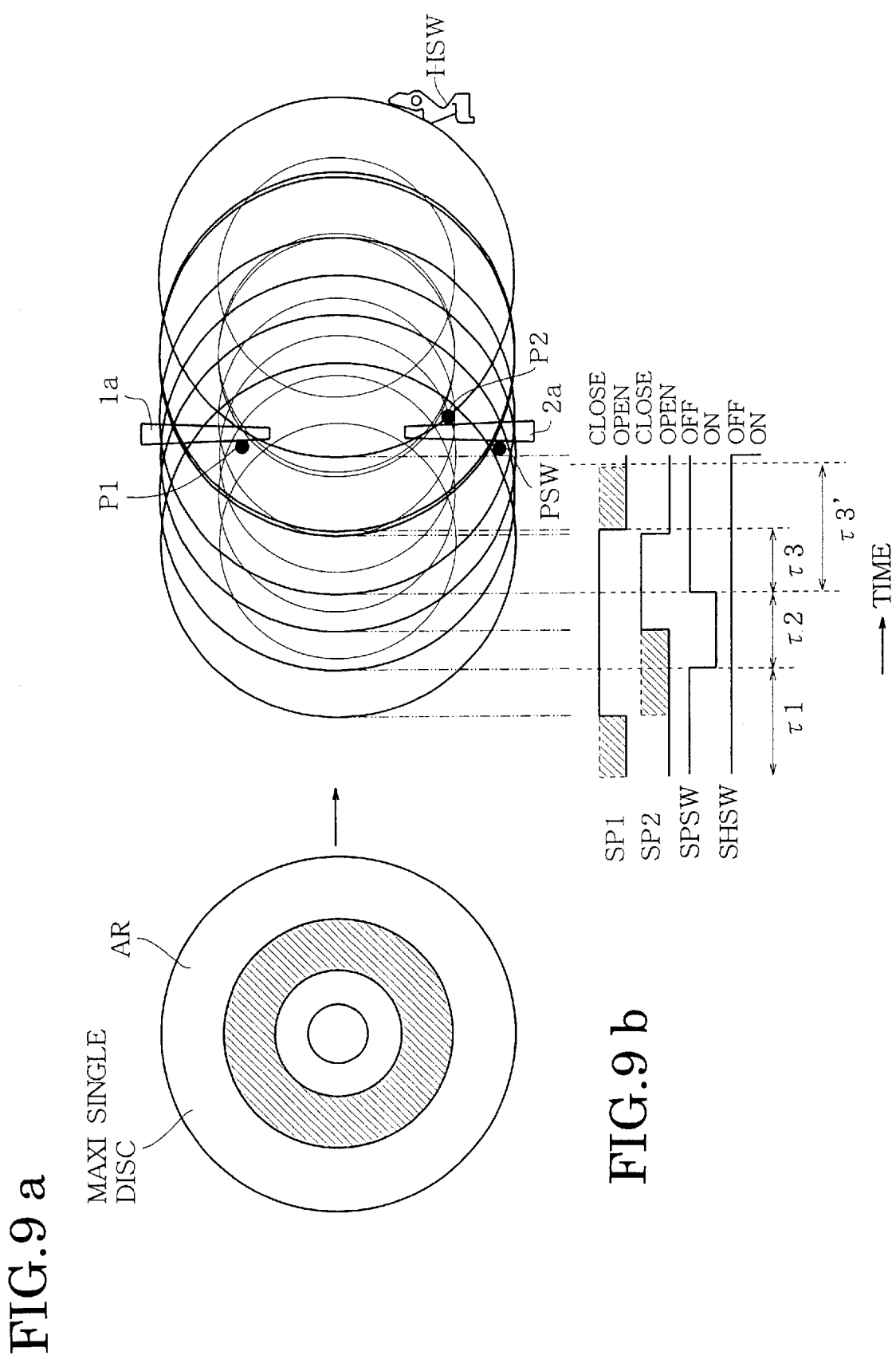

CARRYING DEVICE FOR INFORMATION RECORDING MEDIUM

BACKGROUND OF THE INVENTION

This invention relates to an information recording-reproducing apparatus which records and/or reproduces information on a recording medium, such as a CD (compact disc) and a DVD (digital versatile disc), and more particularly to an information recording-reproducing apparatus of this kind, which has a slot-in type carrier mechanism provided therefor, for installing and ejecting the recording medium.

There are known information recording-reproducing apparatuses having a slot-in type carrier mechanism provided therefor, among which is an information reproducing apparatus mounted in vehicles, i.e. an in-vehicle information reproducing apparatus. The conventional in-vehicle information reproducing apparatus includes carrier mechanism composed of carrier rollers which carry a recording medium into the interior of the apparatus (loading) and eject the recording medium from the apparatus (unloading), and photo sensors which detect the position of the recording medium. The carrier rollers are controlled based on detection signals output from the photo sensors, to thereby carry out the above-mentioned loading and unloading of the recording medium.

In these years, however, various types of recording media have been developed which are the same in information recording and reproducing method but different in standard. For instance, with respect to CD's (compact discs), in addition to two conventionally known discs, i.e. a 8-cm diameter disc and a 12-cm diameter disc, a Maxi single disc has been standardized recently. To cope with the variety of the types, it is a significant challenge for the information reproducing apparatus to enhance its general applicability, i.e. to be applicable to any discs irrespective of their types.

FIGS. 14 to 16 show the formats of a 8-cm diameter disc, a 12-cm diameter disc, and a Maxi single disc, respectively. The 8-cm diameter disc (see FIG. 14) includes a center hall having a bore diameter of 15 mm, a clamping area having a diameter of 33 mm, and a program area, on which information is recorded, at an outer periphery thereof outside a circle having a diameter of 50 mm. On the other hand, the 12-cm diameter disc (see FIG. 15) includes a center hole and a clamping area which are the same in diameter as the 8-cm diameter disc, and a program area at an outer periphery thereof outside a circle having a diameter of 50 mm.

The Maxi single disc (see FIG. 16) which has been standardized recently has a diameter of 120 mm, and includes a center hole and a clamping area which are the same in diameter as the 8-cm diameter disc, and a program area at an outer periphery thereof defined by an inner circle having a diameter of 50 mm and an outer circle having a possible maximum diameter of 82 mm. In other words, the Maxi single disc is formatted to have both the standards of the 8-cm diameter disc and the 12-cm diameter disc. However, its program area is set almost the same area as the 8-cm diameter disc, and therefore an outer peripheral area AR outside the 82-mm diameter circle is not the program area. The outer peripheral area AR may be formed of a transparent material or an opaque material, on which pictures, letters, or graphics may be drawn.

As mentioned hereinabove, since various types of the discs exist which are the same in information recording and reproducing method but different in format, it is a significant challenge to impart general applicability to an information recording-reproducing apparatus. Especially, to positively install and eject the disc, the carrier mechanism is required to have improved accuracy in sensing the difference between the types of the discs.

In addition to the above mentioned discs in various types, there is conventionally proposed a toroidal adapter (see FIG. 17) with which the 8-cm diameter disc is treated as the 12-cm diameter disc in appearance.

The adapter is formed to have a 12-cm diameter and therein a circular hole BR having a diameter of 80 mm, in which the 8-cm diameter disc is mounted. By mounting the 8-cm diameter disc in the circular hole BR, the disc as a whole can be treated similarly to the 12-cm diameter disc.

However, the adapter like this can cause the following disadvantage: For example, the user can insert the adapter into the information recording-reproducing apparatus without mounting the 8-cm diameter disc. In such a case, the adapter must be quickly ejected as a foreign matter, to thereby prevent an unexpected accident beforehand. The real discs should be discriminated from not only the adapter shown in FIG. 17 but also any types of foreign matters, and therefore when the foreign matter is inserted, it should be positively ejected, to thereby prevent an unexpected accident.

SUMMARY OF THE INVENTION

It is therefore an object of the invention to provide an information recording-reproducing apparatus which has general applicability to discs manufactured according to different standards as well as be capable of preventing an unexpected accident caused by insertion of a foreign matter.

To attain the object, the invention provides an information recording-reproducing apparatus intended for carrying and installing a large diameter disc-type recording medium and a small diameter disc-type recording medium, including a carriage path, and carrier means for carrying the recording medium along the carriage path. The information recording-reproducing apparatus comprises optical detecting means arranged in the carriage path at a location close to the carrier means, for optically detecting the recording medium when the recording medium passes through the carriage path, mechanical detecting means arranged in the carriage path at a location close to the carrier means and outside the optical detecting means with respect to a center of the carriage path, for mechanically detecting the recording medium when the recording medium passes through the carriage path, and determining means for determining whether an inserted object is the large diameter disc-type recording medium, a small diameter disc-type recording medium, or an object not to be installed, based on detection signals output from the optical detecting means and the mechanical detecting means.

Preferably, the carriage path has a width almost equal to a diameter of the large diameter recording medium, the mechanical detecting means being arranged at one peripheral end of the carriage path.

More preferably, the optical detecting means are comprised of a first optical detector and a second optical detector, the first optical detector and the second optical detector being arranged at an interval smaller than a diameter of the small diameter recording medium, the first optical detector and the mechanical detecting means being arranged at an interval larger than the diameter of the small diameter recording medium, the second optical detector and the mechanical detecting means being arranged at an interval smaller than the diameter of the small diameter recording medium.

According to the arrangement, the large diameter disc-type recording medium is detected based on the detection signals output from the first and second optical detectors and the mechanical detecting means, while the small diameter disc-type recording medium is detected based on the detection signals output from the first and second optical detectors.

Further preferably, the information recording-reproducing apparatus includes control means for controlling the carrier means, wherein the control means output a control signal for instructing an ejecting operation to the carrier means when the determining means determine that the inserted object is the object not to be installed, the carrier means performing the ejecting operation in response to the control signal.

According to the arrangement, when a foreign matter other than the real recording medium or the like is inserted into the apparatus, the foreign matter is ejected out of the apparatus, and the carrier means are stopped. As a result, the apparatus can be prevented from being damaged.

The above and other objects, features and advantages of the invention will be more apparent from the following detailed description taken in conjunction with the accompanying drawings.

BRIEF DESCRIPTION OF THE DRAWINGS

FIG. 5(a) is a circuit diagram showing the arrangement of the first optical detector P1;

FIG. 5(b) is a circuit diagram showing the arrangement of the second optical detector P2;

FIG. 5(c) shows a truth table showing a relationship in level between detection signals output from the first and second optical detectors P1, P2;

FIG. 5(d) is a circuit diagram showing the arrangement of the side switch PSW;

FIG. 5(e) is a circuit diagram showing the arrangement of the homes switch HSW;

FIG. 5(f) shows a truth table showing a relationship in level between detection signals output from the home switch HSW and the side switch PSW;

FIG. 9(a) is a descriptive drawing useful in explaining a manner of insertion of a Maxi single disc;

FIG. 9(b) is a timing chart showing changes in the detection signals according to the above-mentioned insertion;

DETAILED DESCRIPTION OF THE PREFERRED EMBODIMENTS

The invention will now be described in detail with reference to the drawings showing embodiments thereof. The term the information recording-reproducing apparatus according to the invention refers to an information recording apparatus which records information on a recording medium, an information reproducing apparatus which reads and reproduces information recorded on the recording medium, and an information recording-reproducing apparatus which records information and reproduces the recorded information on the recording medium. Specifically, in the following embodiment, description will be made of an information reproducing apparatus to be mounted in vehicles, which has provided therefor a slot-in type carrier mechanism and a so-called auto-changer mechanism, and accepts and installs discs having the same information reproducing method but being different in standard (format), as well as an adapter, shown in FIGS. 14 to 17, by way of example.

Figure 1:
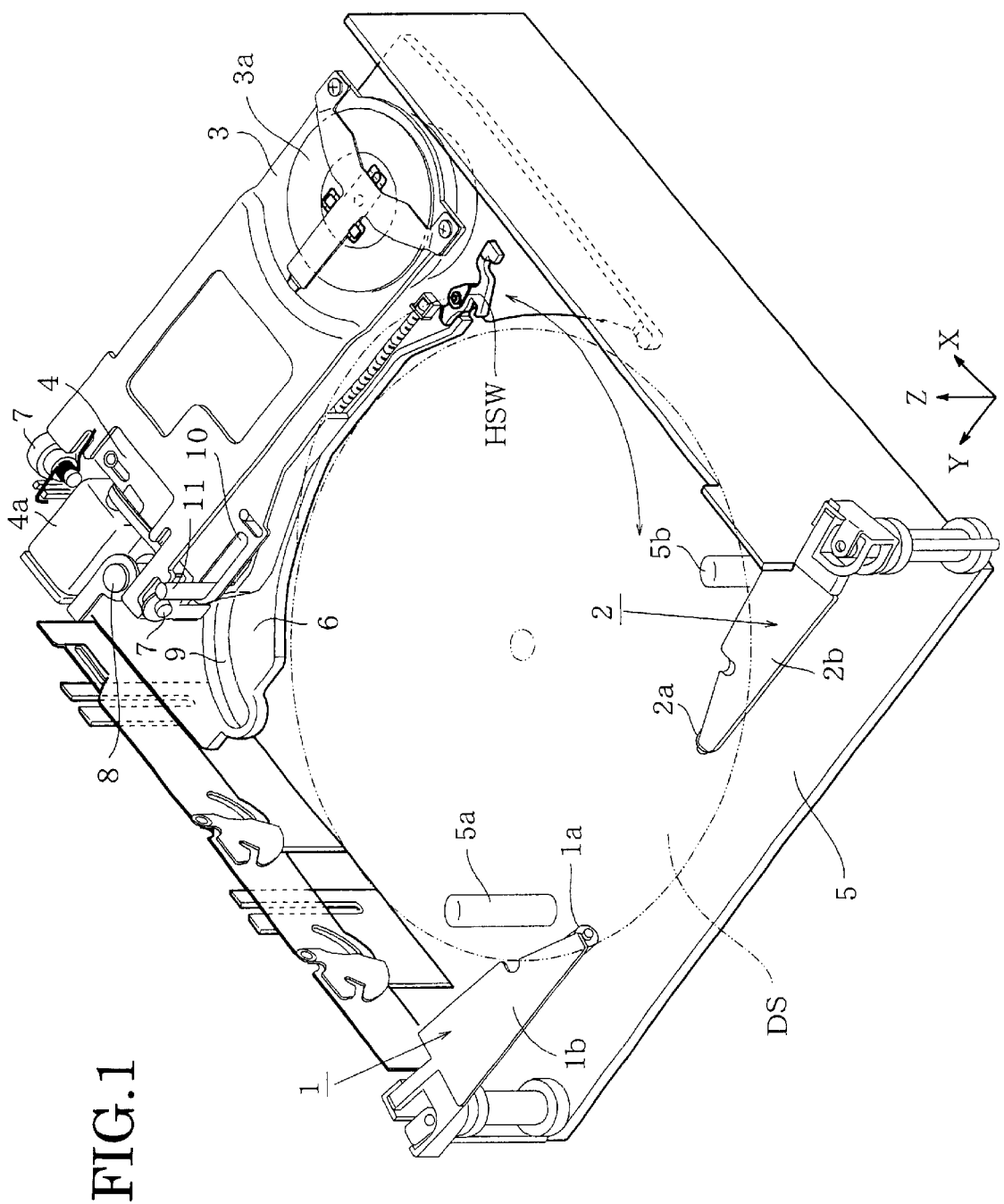
FIG. 1 is a perspective view showing the construction of the essential part of an information recording-reproducing apparatus according to an embodiment of the invention.

Referring first to FIG. 1, there is schematically illustrated the construction of an information reproducing apparatus according to the embodiment, in which a housing thereof is removed. The information reproducing apparatus is comprised of a pair of disc carrier mechanisms 1, 2, a clamping mechanism 3, an optical pickup mechanism 4, a fixed chassis 5, and a plurality of (e.g. 6) accommodating trays 12 (not shown in FIG. 1). The carrier mechanisms 1, 2 function to install a disc DS which is inserted into the interior of the information reproducing apparatus from a disc insertion port (not shown) formed in a front panel of the housing, and to eject the disc DS housed in the apparatus out of the disc insertion port. The clamping mechanism 3 is arranged at a rear region of the apparatus, and the optical pickup mechanism 4 is arranged under a rear side of the clamping mechanism 3 such that the clamping mechanism 3 is superposed on the pickup mechanism 4. The fixed chassis 5 has a pair of columnar shafts 5a, 5b raised thereon, and the accommodating trays 12, referred to hereinafter, are vertically moved by means of an elevator mechanism, not shown, supported by the columnar shafts 5a, 5b.

The front panel is provided thereon with an open/close door which is driven by a predetermined actuator mechanism, for opening and closing the disc insertion port, a display section, and operation button switches. Further, a carriage path having a width almost equal to a diameter of the 12-cm diameter disc DS is formed in the apparatus at a location between the disc insertion port and the disc carrier mechanisms 1, 2, along which a disc guide is arranged for guiding the disc DS passing therethrough. These component elements mentioned above are not shown in FIG. 1.

The clamping mechanism 3 and the optical pickup mechanism 4 are mounted on another chassis (hereinafter referred to as "the mobile chassis") 6 arranged on the fixed chassis 5. In other words, the clamping mechanism 3 is supported by a hinge mechanism 7 so as to move up and down (in a direction indicated by an arrow Z), over the optical pickup mechanism 4, and the optical pickup mechanism 4 is supported by a support shaft 8 raised on an end of the mobile chassis 6 such that the mechanism 4 can move along a horizontal plane (X-Y plane). Further, the mobile chassis 6 is provided therein with an arc-shaped guide hole 9, the pickup mechanism 4 is provided therein with a long hole 10, and a guide shaft 11 is fitted into these holes. Therefore, the guide shaft 11 moves to and fro in a predetermined direction by means of an actuator mechanism, not shown, which enables the optical pickup mechanism 4 and the clamping mechanism 3 to be shifted with respect to the support shaft 8.

Figure 2:
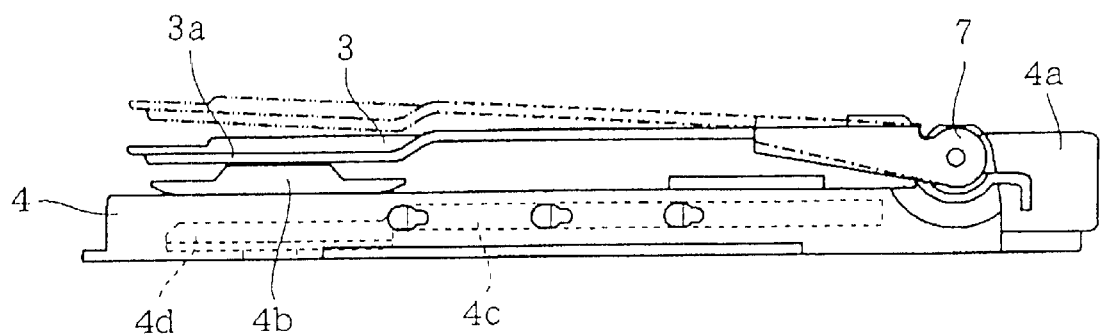
FIG. 2 is a side view schematically showing the construction of an optical pickup mechanism and a clamping mechanism of the information recording-reproducing apparatus.

Further, as shown in a side view of FIG. 2, the clamping mechanism 3 which can be shifted has an almost circular hub 3a for clamping, so as to face downward. On the other hand, the optical pickup mechanism 4 has a turn table 4b arranged thereon, so as to be opposed to the hub 3a. The turn table is driven for rotation of the disc DS by a thin motor 4d, such as a piezoelectric motor. Further, the optical pickup mechanism 4 includes an optical pickup main body 4c which can be moved to and fro in a horizontal plane with respect to the turn table 4b by means of a spindle shaft, not shown, which is interlocked to a spindle motor 4a.

Referring again to FIG. 1, the optical pickup mechanism 4 is provided with a mechanical switch (hereinafter referred to as "the home switch") HSW formed by a microswitch or the like, at an end portion thereof. The home switch HSW is provided for detecting arrival of the disc DS at a clamping position, and upon detection that the delivered disc DS comes in contact therewith, the home switch HSW outputs a detection signal $S_{HSW}$.

Figure 3:
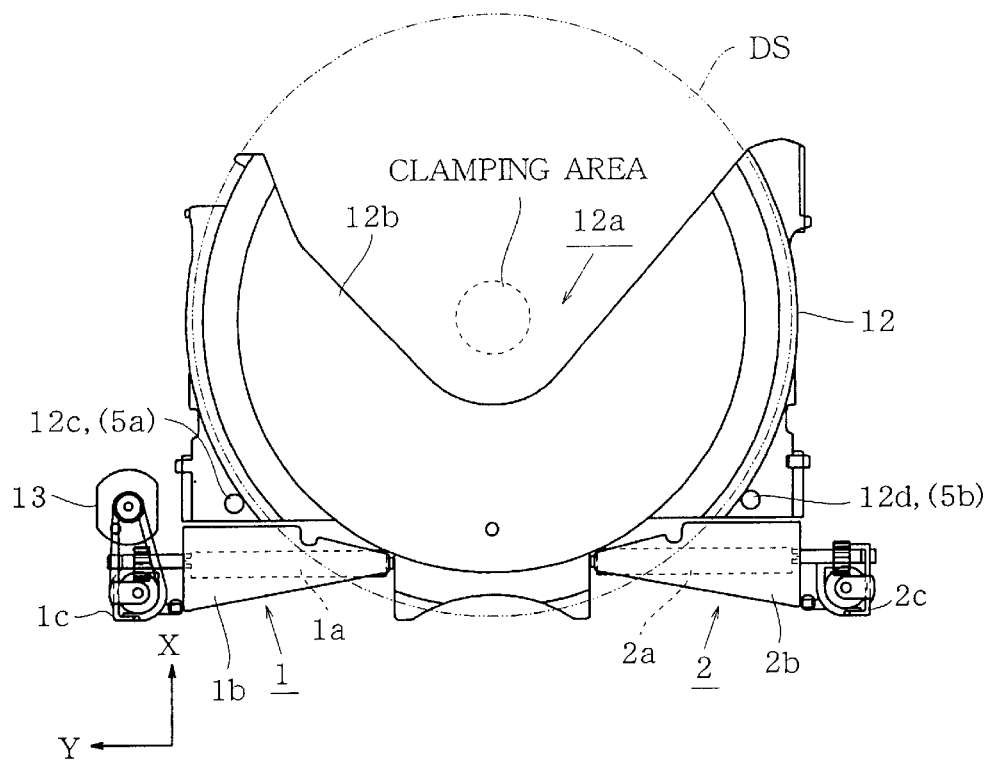
FIG. 3(a) is a plan view showing disc carrier mechanisms of the information recording-reproducing apparatus, in positions assumed during loading and unloading of a disc.
FIG. 3(b) is a plan view showing the disc carrier mechanisms in positions assumed when shifted toward the disc insertion port and held on standby.
Figure 3:
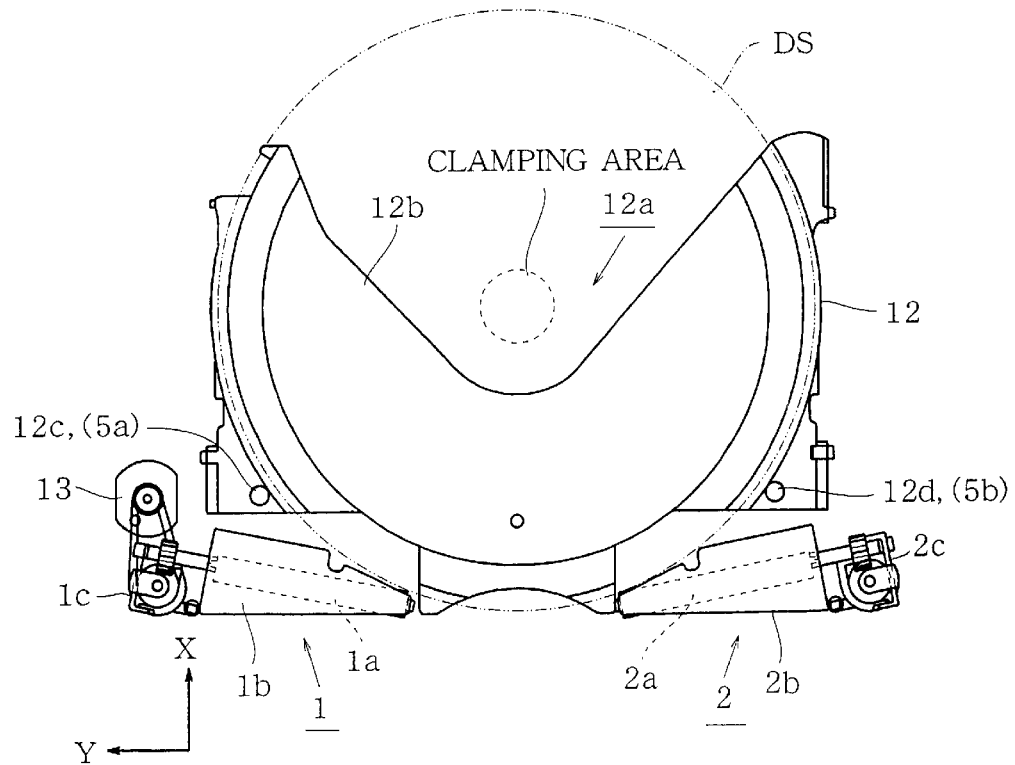

FIGS. 3 (a) and 3 (b) each show the construction of the disc carrier mechanisms 1, 2, the relationship in position between the disc carrier mechanisms 1, 2 and the accommodating trays 12 disposed between the optical pickup mechanism 4 and the clamping mechanism 3, and the shape of each accommodating tray 12.

In the figures, the accommodating tray 12 is a plate member having a disc bearing surface 12b in which an almost V-shaped recess 12a is formed. Further, formed in the accommodating tray 12 are through holes 12c, 12d at locations on both sides of the disc bearing surface 12b, and the columnar shafts 5a, 5b are fitted into the through holes 12c, 12d, respectively. The accommodating trays 12 are superposed to form six layers which are supported by the columnar shafts 5a, 5b, and moved in the direction of z by means of the elevator mechanism.

The disc carrier mechanisms 1, 2 are arranged on both sides of the six-layered accommodating trays 12 at respective locations closer to the front panel. The disc carrier mechanisms 1, 2 are almost in parallel with a direction indicated by an arrow Y, as shown in FIG. 3(a), during so-called loading and unloading. On the other hand, when some of the six-layered accommodating trays accommodate therein the discs DS or when the six-layered accommodating trays 12 move up and down along the columnar shafts 5a, 5b, the carrier mechanisms 1, 2 are shifted toward the disc insertion port, as shown in FIG. 3(b).

The disc carrier mechanisms 1, 2 each include a carrier roller 1a, 2a, a flat abutting member 1b, 2b arranged over the carrier roller 1a, 2a, and a power transmission mechanism 1c, 2c formed by a gear mechanism and a belt mechanism. Further, a driving motor 13 is provided in the vicinity of the carrier mechanism 1, and a driving force thereof is transmitted via the power transmission mechanisms 1c, 2c to the carrier rollers 1a, 2a, respectively, to thereby rotate the same.

The carrier rollers 1a, 2a carry out forward rotation during loading such that the disc DS is carried toward the side of the accommodating tray 12, while they carry out reverse rotation during unloading such that the disc DS is ejected from the side of the accommodating tray 12. The rotation and stoppage of the carrier rollers 1a, 2a are synchronously controlled. Further, the carrier rollers 1a, 2a each have a conical trapezoidal shape such that they each taper at an end portion facing the other. By virtue of the shape, the disc DS can be carried through the center of the carriage path during the loading and unloading, i.e. the disc DS is centered while being carried (so-called "centering").

When the user operates the operation button switch on the front panel to selectively designate a desired one of the accommodating trays 12, the designated accommodating tray 12 is automatically positioned with respect to the carrier rollers 1a, 2a by means of the elevator mechanism. Then, as soon as the user inserts the disc DS into the disc insertion port, the carrier roller 1a and the abutting member 1b cooperate with the counter ones 2a, 2b in retaining the disc DS for loading, to thereby place the disc DS on the designated accommodating tray 12.

When the user designates sound reproduction, the tray 12 accommodating the designated disc DS is automatically positioned with respect to the optical pickup mechanism 4 and the clamping mechanism 3 by means of the elevator mechanism, then the clamping mechanism 3 is slightly shifted upward away from the optical pickup mechanism 4, and therefore the optical pickup mechanism 4 and the clamping mechanism 3 enter the recess 12a of the accommodating tray 12. Thereafter, the clamping mechanism 3 is closed toward the optical pickup mechanism 4, followed by clamping the disc DS between the hub 3a and the turn table 4b, whereby recorded information is read and reproduced by the optical pickup main body 4c of the optical pickup mechanism 4.

On the other hand, when the user provides an instruction to eject the disc DS which has been already accommodated in the tray 12, the optical pickup mechanism 4 and the clamping mechanisms 3 return to predetermined standby positions, respectively, as shown in FIG. 1, and the tray 12 accommodating the designated disc DS is automatically positioned with respect to the carrier rollers 1a, 2a by means of the elevator mechanism. Then, the disc DS is unloaded by the carrier rollers 1a, 2a such that the disc DS is retained by the abutting members 1b, 2b, to thereby eject the disc DS out of the disc insertion port.

Next, description will be made of a control mechanism for controlling the disc carrier mechanisms 1, 2, with reference to FIGS. 4 to 13.

Figure 4:
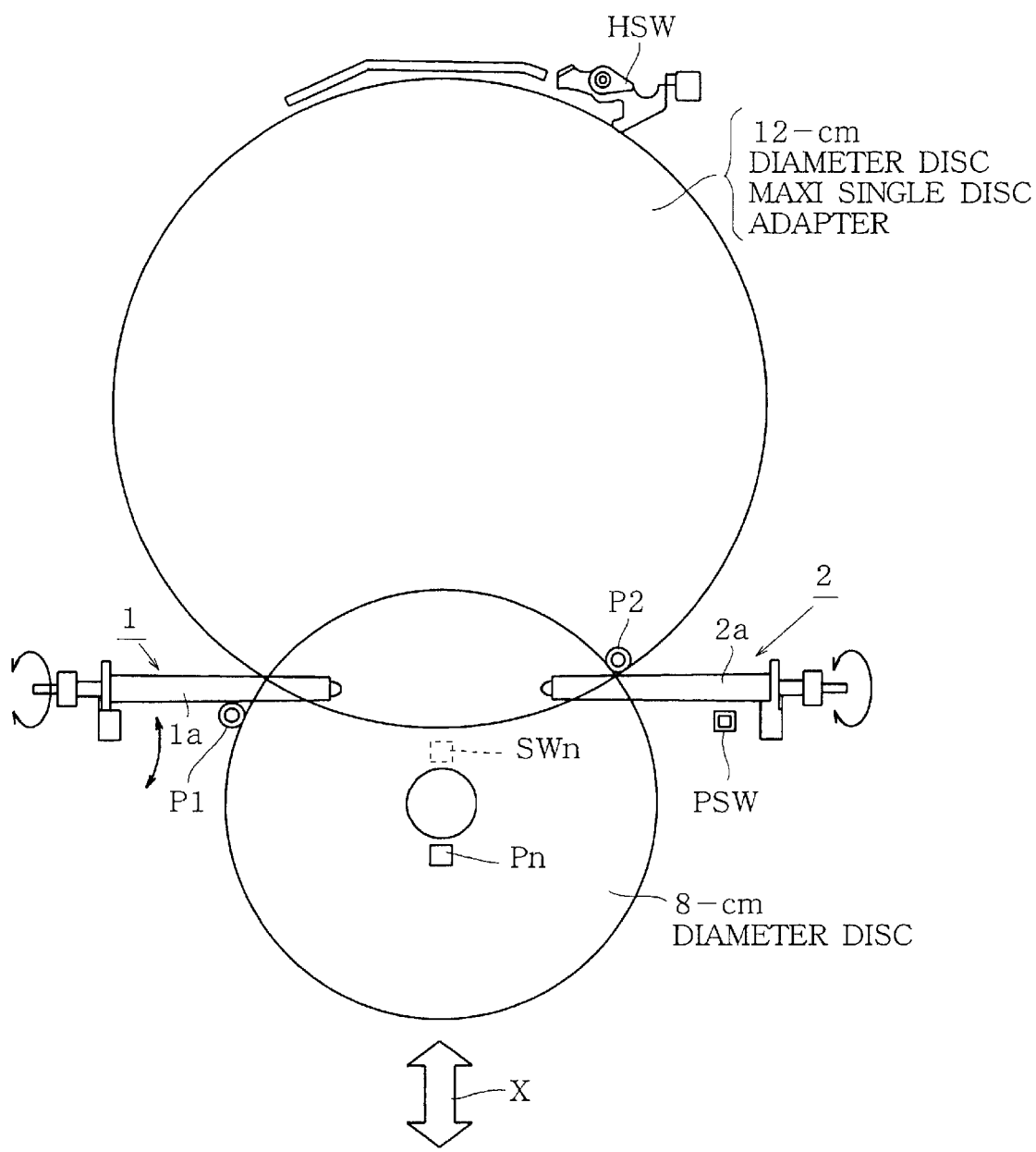
FIG. 4 is a plan view showing the arrangement of optical detectors P1, P2, a side switch PSW, and a home switch HSW which are arranged in a carriage path.

As shown in a plan view of FIG. 4, in addition to the home switch HSW mentioned above, there are arranged a first optical detector P1 in front of the carrier roller 1a, and a second optical detector P2 behind the carrier roller 2a, respectively. Further, a mechanical switch (hereinafter referred to as "the side switch") PSW formed by a microswitch or the like, is arranged along with a carrier surface of the carrier roller 2a.

The first and second optical detectors P1 and P2 are spaced less than 8 cm away from each other, i.e. arranged at an interval smaller than a diameter of the 8-cm diameter disc DS. Further, the first optical detector P1 is provided mainly for detecting insertion of the disc to activate the carrier rollers 1a, 2a, while the second optical detector P2 is provided mainly for detecting a rear end portion of the disc when ejected to terminate rotations of the carrier rollers 1a, 2a.

The side switch PSW is arranged at a location at which the 12-cm diameter disc DS allows its peripheral edge to come in contact with the same when the disc DS is carried by being retained between the carrier rollers 1a, 2a and the abutting members 1b, 2b. The distance between the first optical detector P1 and the side switch PSW is set to a value larger than the diameter of the 8-cm diameter disc DS.

As shown in circuit diagrams of FIGS. 5(a) and 5(b), the first and second optical detectors P1, P2 are applications of photo interrupters each including a photo diode and a photo transistor facing each other. Further, as understood from a truth table of FIG. 5(c), when an object such as the disc DS passes between the photo diode and the photo transistor (hereinafter referred to as the "CLOSE level"), the voltage levels of respective detection signals $S_{P1}$ and $S_{P2}$ are at logic H (high), whereas when no object passes between the photo diode and the photo transistor (hereinafter referred to as the "OPEN level"), the voltage levels of the respective detection signals $S_{P1}$ and $S_{P2}$ are at logic L (low).

On the other hand, as shown in circuit diagrams of FIGS. 5 (d) and 5(e), the side switch PSW and the home switch HSW are each formed by a normally open microswitch and a transistor. Further, as understood from a truth table of FIG. 5(F), when an object such as the disc DS does not come in contact with the microswitch (hereinafter referred to as the "OFF level"), the voltage levels of detection signals $S_{PSW}$ and $S_{HSW}$ are at logic H (high). On the other hand, when the object comes in contact with the microswitch (hereinafter referred to as the "ON level"), the voltage levels of the detection signals $S_{PSW}$ and $S_{HSW}$ are at logic L (low).

In regard of this point, the first and second optical detectors P1 and P2 are each formed by a transmission-type optical detector, according to the present embodiment, which detects interception and transmission of beams depending on presence or absence of the object such as the disc DS, but this is not limitative. Alternatively, a reflection-type optical detector which detects reflected beams of incident light from the object may be employed for detecting presence or absence of the object such as the disc DS.

Next, description will be made of the arrangement of a control circuit for controlling the disc carrier mechanisms 1, 2, based on the detection signals $S_{P1}$, $S_{P2}$, $S_{HSW}$, $S_{PSW}$ which are output from the optical detectors P1, P2, the home switch HSW, and the side switch PSW, respectively, with reference to FIGS. 6 and 7.

The control circuit shown in each figure is mounted on an electric circuit substrate which is attached to a rear surface of the fixed chassis 5 or the like, and comprised of a central control unit 14 having a microprocessor unit (MPU), and a driving section 15 for supplying power to the driving motor 13 which drives the carrier rollers 1a, 2a, according to an instruction from the central control unit 14.

Further, the control circuit is comprised of first to ninth state monitoring sections 16 to 24 and timeout monitoring sections 25 to 27 which are each formed as the firmware according to a system program previously stored in a read only memory (ROM).

More specifically, the ROM is connected to the central control unit 14, and the system programs stored in the ROM is executed by the microprocessor unit (MPU) in the central control unit 14, to thereby realize the first to ninth state monitoring sections 16 to 24 and the timeout monitoring sections 25 to 27 each having a function equivalent to the hardware.

In actuality, the detection signals $S_{P1}$, $S_{P2}$, $S_{HSW}$, $S_{PSW}$ output from the first and second optical detectors P1, P2, the home switch HSW, and the side switch PSW, respectively, are supplied to the central control unit 14 which then controls the carrier rollers 1a, 2a in response to these signals $S_{P1}$, $S_{P2}$, $S_{HSW}$, $S_{PSW}$. To make clearer and more understandable the description of the invention, it is assumed, for the sake of convenience, that the state monitoring sections 16 to 19 each having an individual function are supplied with the detection signals $S_{P1}$, $S_{P2}$, $S_{HSW}$, $S_{PSW}$. Further, the arrangement of the control circuit for executing the loading operation of the carrier rollers 1a and 2a is shown in FIG. 6, while the arrangement of the same for executing the unloading operation is shown in FIG. 7.

Figure 6:
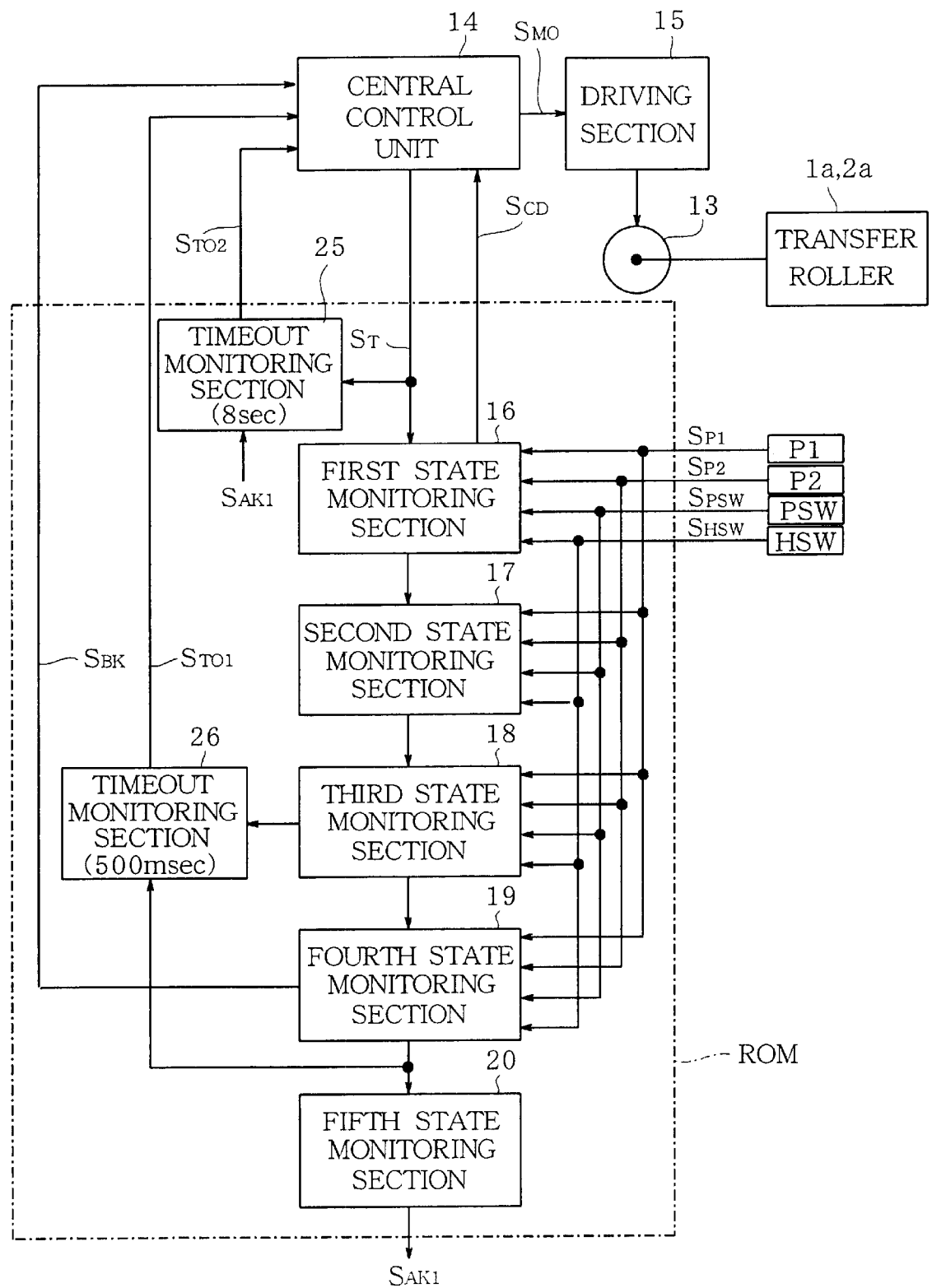
FIG. 6 is a block diagram showing the arrangement of a control circuit for controlling an operation of carrier mechanisms during installation of the disc.

As understood from FIG. 6, when the user provides an instruction to insert the disc DS, the central control unit 14 supplies a start signal $S_T$ to the first state monitoring section 16 in synchronization with the instruction. Further, the central control unit 14 supplies a control signal $S_{MO}$ to the driving section 15 in synchronization with the start signal $S_T$, which allows the carrier rollers 1a, 2a to start forward rotation.

Then, the first state monitoring section 16 starts its operation in synchronization with the start signal $S_T$, i.e. to check changes in the detection signals $S_{PSW}$ and $S_{P1}$ output from the side switch PSW and the first optical detector P1, respectively, to thereby determine which one of the 8-cm diameter disc DS, the 12-cm diameter disc DS, the Maxi single disc DS, and the adapter is inserted. At the same time, the first state monitoring section 16 returns a determination signal $S_{CD}$ to the central control unit 14.

More specifically, if the first state monitoring section 16 detects, after starting of the forward rotation of the carrier rollers 1a, 2a, that the detection signal $S_{PSW}$ is changed from the OFF level to the ON level while the detection signal $S_{P1}$ remaining in the CLOSE level, the monitoring section 16 determines that one of the 12-cm diameter disc DS, the Maxi single disc DS, and the adapter mounting therein the 8-cm diameter disc has been inserted.

On the other hand, if the detection signal $S_{P1}$ has been changed from the CLOSE level to the OPEN level before the detection signal $S_{PSW}$ is changed from the OFF level to the ON level, it is determined that either the 8-cm diameter disc or the adapter without mounting the 8-cm diameter disc has been inserted.

The first state monitoring section 16 carries out the above determination process over a time period τ1 from the time the user provided the instruction to insert the disc DS to the time the type of the disc DS inserted into the apparatus is identified.

The second state monitoring section 17 starts its operation in synchronization with a time point at which the first state monitoring section 16 returns the determination signal $S_{CD}$ to the central control unit 14, and monitors the state of disc carriage, based on the detection signals $S_{PSW}$ and $S_{P1}$ from the side switch PSW and the first optical detector P1, respectively. That is, the second state monitoring section 17 monitors the state of the disc carriage immediately after the lapse of the time period τ1, based on changes in the detection signals $S_{PSW}$ and $S_{P1}$.

If the detection signal $S_{PSW}$ is changed from the OFF level to the ON level while the detection signal $S_{P1}$ remaining in the CLOSE level, the second state monitoring section 17 detects the change, thereby issuing an instruction to start an operation to the third state monitoring section 18. Accordingly, the second state monitoring section 17 executes the above determination process over a time period τ2, i.e. immediately after the lapse of the above-mentioned time period τ1 to the determination of the above change.

The third state monitoring section 18 monitors the state of the disc carriage immediately after the lapse of the above-mentioned time period τ2. Herein, the timeout monitoring section 26 formed by a program timer is started immediately after the lapse of the time period τ2.

Further, if it is determined that the detection signal $S_{P1}$ has been changed from the CLOSE level to the OPEN level, the third state monitoring section 18 issues an instruction to start an operation to the fourth state monitoring section 19. Accordingly, the third state monitoring section 18 monitors the state of the disc carriage over a time period τ3, i.e. immediately after the lapse of the above-mentioned time periot τ2 to the time the detection signal $S_{P1}$ is changed to the OPEN level.

The fourth state monitoring section 19 supplies a brake control signal $S_{BK}$ to the central control unit 14 immediately after the lapse of the time period τ3.

Upon reception of the brake control signal $S_{BK}$, the central control unit 14 issues an instruction, to the driving section 15, to rotate the carrier rollers 1a, 2a at a slightly high rotational speed over a short time period, whereby the rollers 1a, 2a delivers the disc DS in a manner pressing the same toward the accommodating tray 12.

When the leading end of the disc DS comes in contact with the home switch HSW to change the level of the detection signal $S_{HSW}$ of the home switch HSW from the OFF level to the ON level, the fourth state monitoring section 19 determines that the level of the home switch HSW has been changed, and then supplies a result of determination to the timeout monitoring section 26. At the same time, the fifth state monitoring section 20 is started to execute its operation.

Herein, if the detection signal $S_{HSW}$ is not changed from the OFF level to the ON level even when a measured time period $T_{O1}$ exceeds a first predetermined timeout period of 500 msec, the timeout monitoring section 26 outputs a timeout signal $S_{TO1}$ indicative of occurrence of abnormality to the central control unit 14, to thereby terminate the operation of the carrier rollers 1a, 2a.

Upon reception of the above-mentioned determination result from the fourth state monitoring section 19, the fifth state monitoring section 20 determines that the disc DS has been loaded normally on the accommodating tray 12, and therefore, it outputs a confirmation signal $S_{AK1}$ to the time out monitoring section 25 formed by a program timer or the like.

If the timeout monitoring section 25 receives the confirmation signal $S_{AK1}$ after the output of the start signal $S_T$ and before the lapse of a second timeout period of 8 sec, it supplies a signal indicative of the fact that the carriage operation has been carried out normally, to the central control unit 14, and then the central control unit 14 forcibly terminates the operation of the carrier rollers 1a, 2a, based on the signal.

On the other hand, if the timeout monitoring section 25 does not receive the confirmation signal $S_{AK1}$ even if a time period $T_{O2}$ measured after the output of the start signal $S_T$ exceeds the predetermined second timeout period of 8 sec, it supplies a timeout signal $S_{TO2}$ indicative of occurrence of abnormality to the central control unit 14, and then the central control unit 14 forcibly terminates the operation of the carrier rollers 1a, 2a.

More specifically, the timeout monitoring section 25 monitors the processing time periods required for the first state monitoring section 16 to the fourth state monitoring section 19, based on the timeout period (8 sec), to thereby determine whether or not abnormality has occurred and whether or not the disc DS has been inserted. On the other hand, the timeout monitoring section 26 monitors whether or not the disc DS has been positively delivered from the positions of the carrier rollers 1a, 2a to the accommodating tray 12, based on the timeout period (500 msec). Further, upon reception of the timeout signals $S_{TO1}$, $S_{TO2}$ from the timeout monitoring sections 25, 26, the central control unit 14 outputs the control signal $S_{MO}$ to the driving section 15, to thereby terminate the operation of the carrier rollers 1a, 2a, or the like. As a result, an accident such as intrusion of a foreign matter into the interior of the apparatus can be prevented.

If the determination signal $S_{CD}$ indicates that either the 8-cm diameter disc DS or the adapter alone has been inserted, the central control unit 14 outputs the control signal $S_{MO}$ to the driving section 15, so that the carrier rollers 1a, 2a carry out reverse rotation and hence unloading operation.

Next, the loading operation will be more specifically described with respect to the respective types of the discs DS and the adapter, with reference to FIGS. 8 to 11. FIGS. 8(a) and 8(b) schematically show a case where the 12-cm diameter disc DS or the adapter mounting therein the 8-cm diameter disc DS is inserted, FIGS. 9(a) and 9(b) a case where the Maxi single disc DS is inserted, FIGS. 10(a) and 10(b) a case where the adapter alone is inserted without mounting the 8-cm diameter disc DS, and FIGS. 11(a) and 11(b) a case where the 8-cm diameter disc DS is inserted, respectively.

Further, in each of FIGS. 8(b), 9(b), 10(b), and 11(b), changes in voltage level of the optical detection signals $S_{P1}$, $S_{P2}$, $S_{HSW}$, $S_{PSW}$ output from the first and second optical detectors P1, P2, the home switch HSW, and the side switch PSW, respectively, are shown according to the change in operation of each of the discs DS and the adapter. Further, τ1 to τ3 in each figure represent the monitoring time periods τ1 to τ3 for the first to third state monitoring sections 16 to 18, respectively.

Figures 8A, 8B:
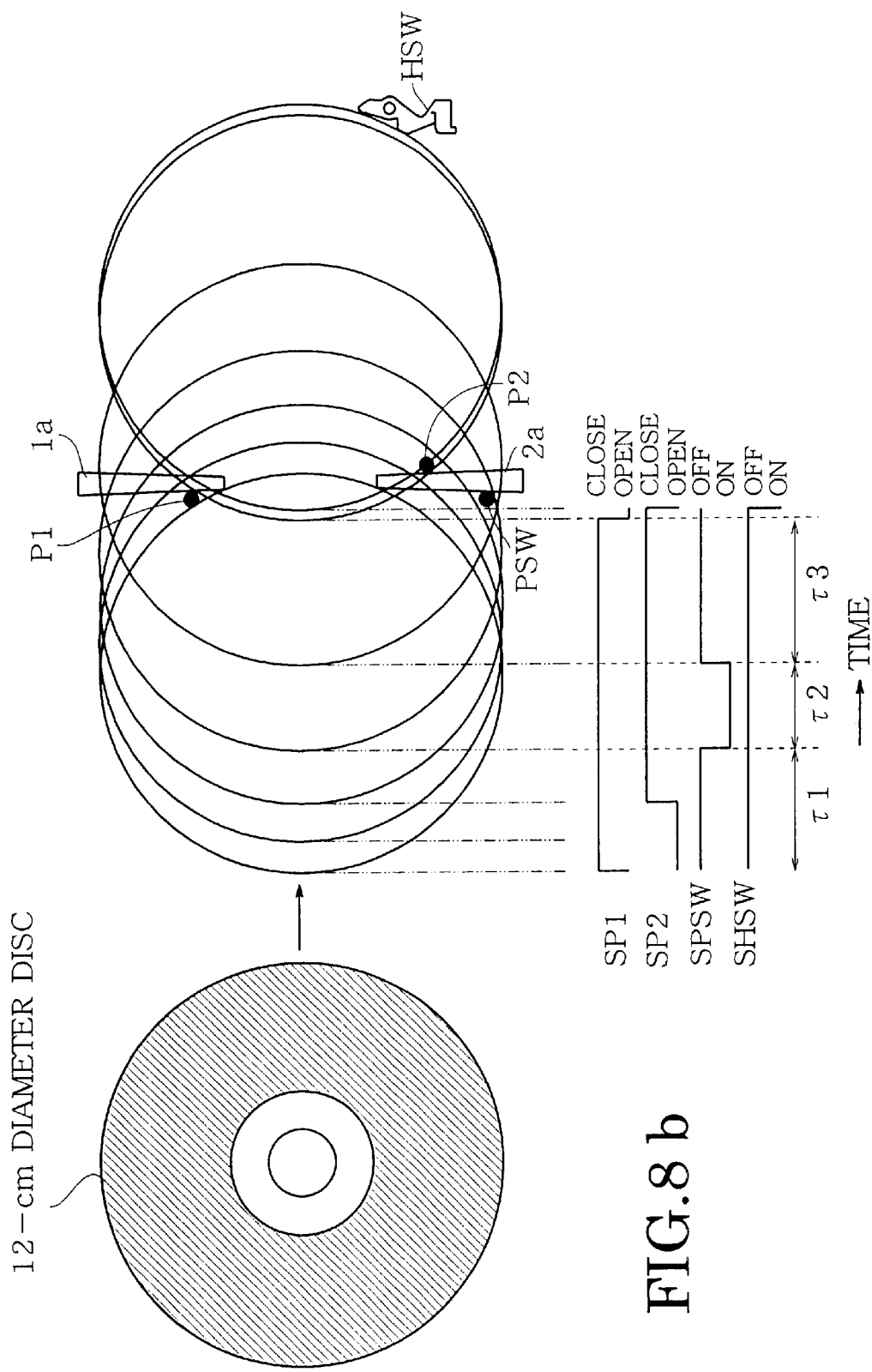
FIG. 8(a) is a descriptive drawing useful in explaining a manner of insertion of a 12-cm diameter disc or an adapter mounting therein a 8-cm diameter disc.
FIG. 8(b) is a timing chart showing changes in the detection signals output from the first and second optical detectors P1, P2, the side switch PSW, and the home switch HSW, according to the above-mentioned insertion.
Figure 10:
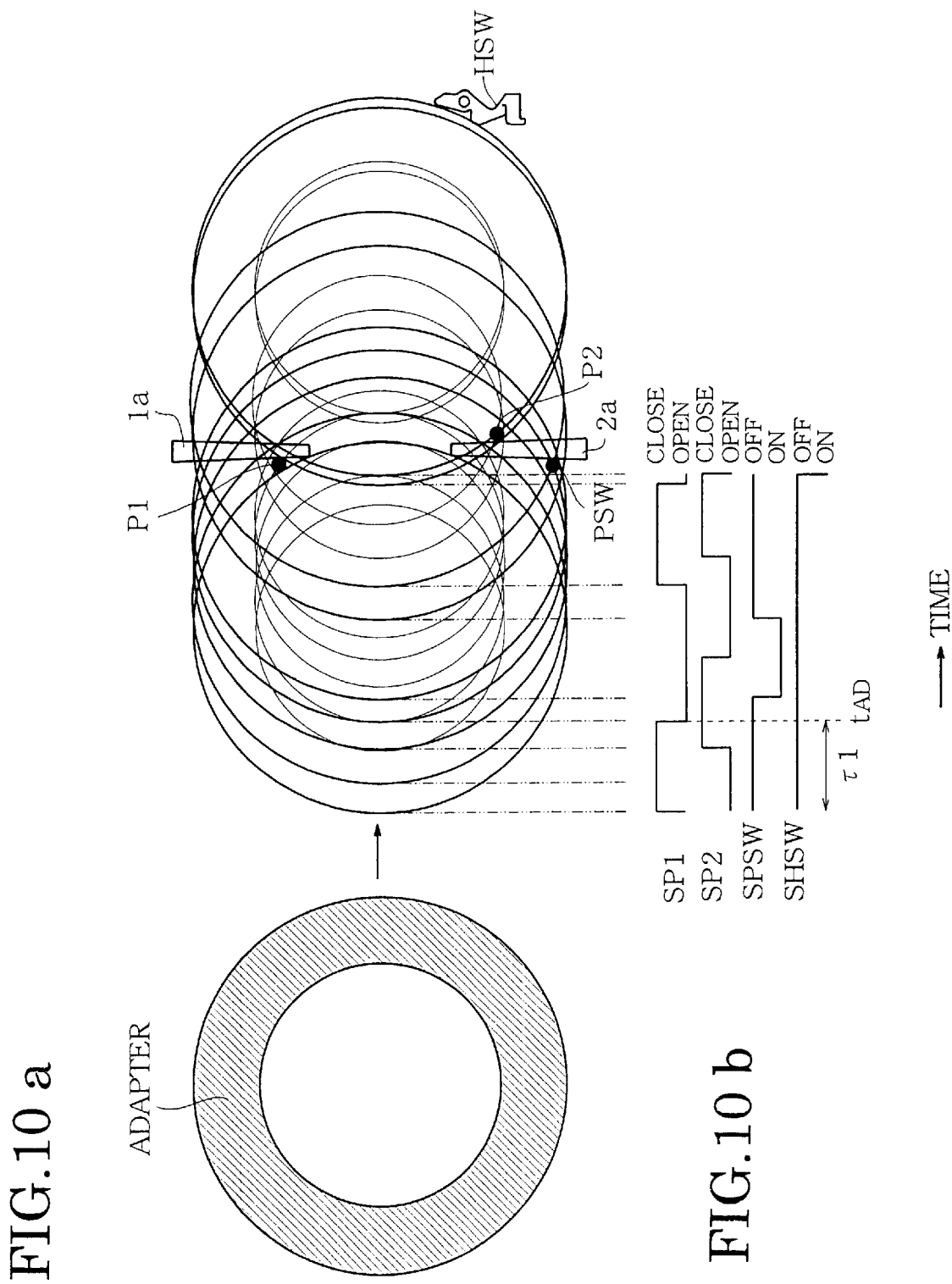
FIG. 10(a) is a descriptive drawing useful in explaining a manner of insertion of the adapter alone.
FIG. 10(b) is a timing chart showing changes in the detection signals according to the above-mentioned insertion.

As shown in FIGS. 8(a) and 8(b), when the 12-cm diameter disc DS is inserted from the disc insertion port, the first optical detector P1 detects the leading end of the 12-cm diameter disc DS before detection of the same by the second optical detector P2, and therefore the detection signal $S_{P1}$ changes from the OPEN level to the CLOSE level prior to the change of the detection signal $S_{P2}$.

The first state monitoring section 16 monitors that the detection signal $S_{P1}$ has been changed to the CLOSE level and sequentially monitors whether or not the detection signal $S_{PSW}$ from the side switch PSW is changed from the OFF level to the ON level. Upon the change of the detection signal $S_{PSW}$ to the ON level, the first monitoring section 16 determines that one of the 12-cm diameter disc DS, the Maxi single disc DS, and the adapter mounting therein the 8-cm diameter disc DS is inserted, and therefore supplies the determination signal $S_{CD}$ to the central control unit 14.

The time period τ1 from the time the first optical detector P1 detects the leading end of the disc DS to the time the determination signal $S_{CD}$ is output corresponds to the monitoring time period τ1 described above. Thereafter, the loading operation is carried out under monitoring by the second to fifth state monitoring sections 16 to 20, and it is completed when the detection signal $S_{HSW}$ from the home switch HSW is inverted from the OFF level to the ON level.

Herein, individual identification of the 12-cm diameter disc DS, the Maxi single disc DS and the adapter mounting therein the 8-cm diameter disc DS is not performed, since they have substantially the same diameter. As a result, the first state monitoring section 16 substantially determines that the 12-cm diameter disc DS has been inserted.

In this manner, the first state monitoring section 16 monitors the detection signals $S_{P1}$ and $S_{PSW}$ and when the detection signal $S_{PSW}$ is changed from the OFF level to the ON level while the detection signal $S_{P1}$ remaining at the CLOSE level within the timeout period of 8 sec, the first state monitoring section 16 determines that the 12-cm diameter disc DS has been inserted.

Further, if the adapter mounting therein the 8-cm diameter disc DS is inserted, identification thereof is carried out under the same monitoring operation, and therefore the adapter with the disc DS is also loaded at the predetermined clamping position without fail.

Next, as shown in FIGS. 9(a) and 9(b), when the Maxi single disc DS is inserted from the disc insertion port, the detection signal $S_{P1}$ from the first optical detector P1 assumes the CLOSE level over a long time period, as well.

In regard of this point, if the Maxi single disc DS has a transparent area AR at an outer periphery thereof, the detection signals $S_{P1}$, $S_{P2}$ from the first and second optical detectors P1, P2 are changed as indicated by the solid lines, respectively. On the other hand, if the area AR is entirely opaque, or partially includes opaque portions due to a pattern, etc., the detection signals $S_{P1}$, $S_{P2}$ are changed from the OPEN level to the CLOSE level during time periods each inclusive of hatched portions in the figure. In both the cases, however, the detection signal $S_{P1}$ from the first optical detector P1 is changed to the CLOSE level before the change of the detection signal $S_{P2}$ from the second optical detector P2.

The first state monitoring section 16 monitors that the detection signal $S_{P1}$ has been changed to the CLOSE level and sequentially monitors whether or not the detection signal $S_{PSW}$ from the side switch PSW is changed from the OFF level to the ON level. Upon the change of the detection signal $S_{PSW}$ to the ON level, the first monitoring section 16 determines that one of the Maxi single disc DS, the 12-cm diameter disc DS, and the adapter mounting therein the 8-cm diameter disc DS is inserted, to thereby supply the determination signal $S_{CD}$ to the central control unit 14.

The time period τ1 from the time the first optical detector P1 detects the leading end of the disc DS to the time the determination signal $S_{CD}$ is output corresponds to the monitoring time period τ1 described above. Thereafter, the loading operation is carried out under monitoring by the second to fifth state monitoring sections 17 to 20, and when the detection signal $S_{HSW}$ of the home switch HSW is inverted from the OFF level to the ON level, the loading is completed.

In this case as well, individual identification of the Maxi single disc DS, the 12-cm diameter disc DS, and the adapter mounting therein the 8-cm diameter disc DS is not carried out, since they have substantially the same diameter. As a result, the first state monitoring section 16 substantially determines that the Maxi single disc DS has been inserted.

In regard of this point, as shown in FIG. 9(b), timing at which the detection signal $S_{P1}$ is changed from the CLOSE level to the OPEN level may be varied depending on an opacity degree of the outer peripheral area AR, i.e. whether or not the outer peripheral area AR is entirely opaque. Therefore, the monitoring time period τ3 may be varied in the range of Σ3". Even if the monitoring time period τ3 is varied, however, the variation in the time period τ3 within the fist timeout period (500 msec) is not regarded as abnormality occurrence, and therefore the Maxi single disc DS can be surely loaded on the predetermined clamping position.

Next, as shown in FIGS. 10(a) and 10(b), when the adapter alone without mounting therein the 8-cm diameter disc DS is inserted from the disc insertion portion, the first optical detector P1 detects the leading end of the adapter before the detection thereof by the second optical detector P2, and therefore the detection signal $S_{P1}$ is changed from the OPEN level to the CLOSE level prior to the change of the detection signal $S_{P2}$. Further, the first optical detector P1 detects a circular opening BR of the adapter, and therefore the detection signal $S_{P1}$ is inverted again from the CLOSE level to the OPEN level.

The side switch PSW is arranged at a location where the outer peripheral edge of the adapter can be detected, and therefore, after the detection signal $S_{P1}$ is inverted again from the CLOSE level to the OPEN level, the detection signal $S_{PSW}$ is changed from the OFF level to the ON level.

If the detection signal $S_{P1}$ is inverted again from the CLOSE level to the OPEN level (at a time point $t_{AD}$) while the detection signal $S_{PSW}$ remaining in the OFF level, the first state monitoring section 16 determines that the adapter alone is inserted. Therefore, the unloading operation is carried out based on a result of determination, whereby the adapter is ejected to the disc insertion port (forcible ejection).

In this manner, in case of insertion of the adapter alone, the adapter is ejected, which leads to prevention of an unexpected accident beforehand.

Figures 11A, 11B:
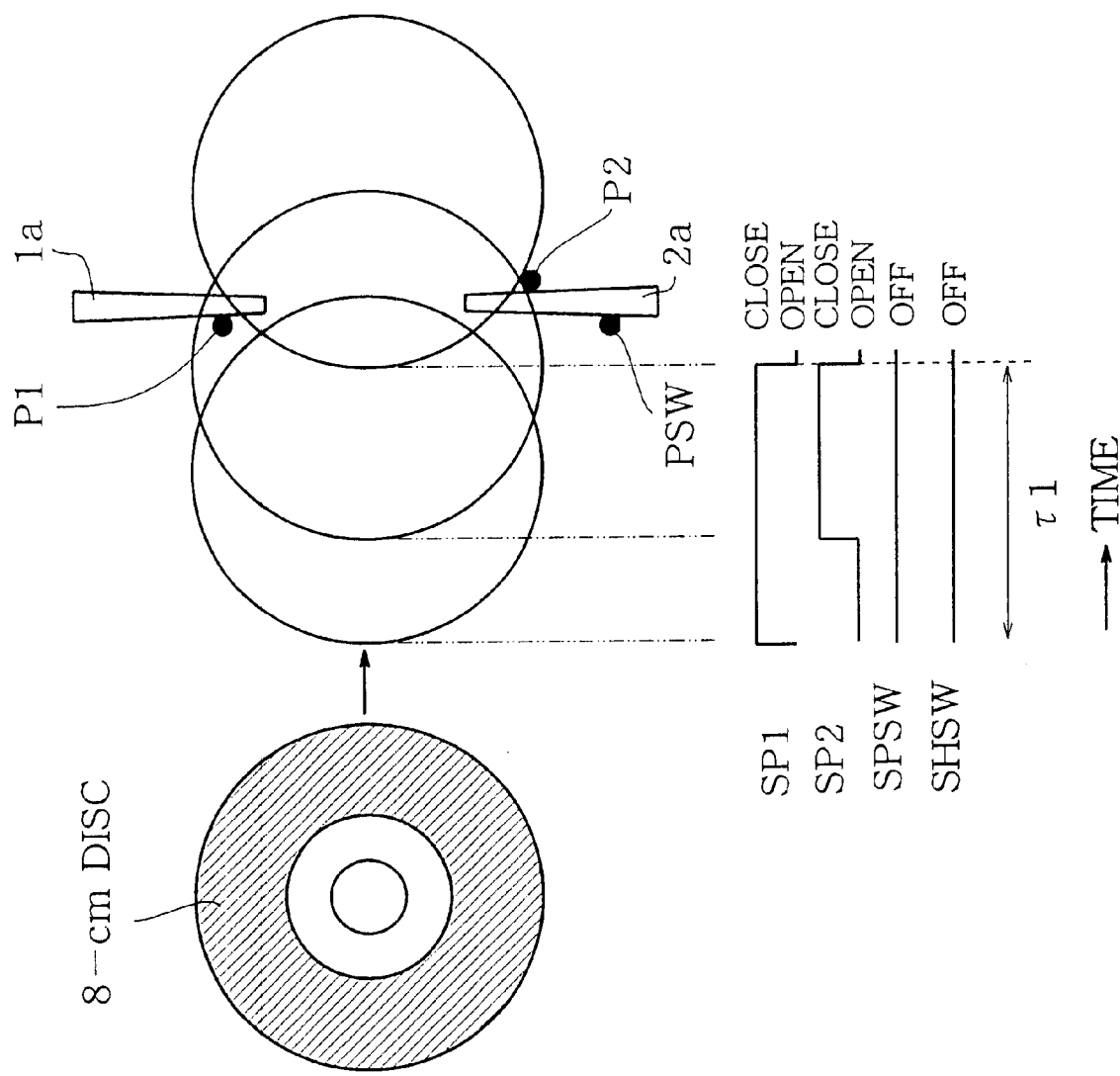
FIG. 11(a) is a descriptive drawing useful in explaining a manner of insertion of a 8-cm diameter disc.
FIG. 11(b) is a timing chart showing changes in the detection signals according to the above-mentioned insertion.

Next, a case where the 8-cm diameter disc DS is inserted will be described with reference to FIGS. 11(a) and 11(b). As shown in the figures, when the 8-cm diameter disc DS is inserted from the disc insertion port into an intermediate area between the carrier rollers 1a, 2a, i.e. a central area in the carriage path, the 8-cm diameter disc DS is delivered without contact with the side switch PSW, and therefore the detection signal $S_{PSW}$ from the side switch PSW assumes the OFF level during the delivery of the disc DS. On the other hand, the first optical detector P1 detects the leading end and the rear end of the 8-cm diameter disc DS. Therefore, the detection signal $S_{P1}$ thereof is changed once from the OPEN level to the CLOSE level, and then inverted again from the CLOSE level to the OPEN level.

The first state monitoring section 16 determines that the 8-cm diameter disc DS alone is inserted when the second inversion of the detection signal $S_{P1}$ from the CLOSE level to the OPEN level has occurred while the detection signal $S_{PSW}$ remaining in the OFF level. Then, unloading is carried out based on a result of determination, and therefore the 8-cm diameter disc DS is ejected to the disc insertion port (forcible ejection).

The information reproducing apparatus according to the present embodiment is applicable to the 12-cm diameter disc DS, the Maxi single disc DS, and the adapter mounting therein the 8-cm diameter disc DS. Therefore, when the 8-cm diameter disc DS is inserted, the disc DS is forcibly ejected. However, as described hereinafter in a variation of the present embodiment, the information reproducing apparatus may be configured to be applicable to the 8-cm diameter disc DS.

Next, description will be made of the arrangement of the control circuit for controlling the unloading operation, with reference to FIG. 7.

In the figure, the sixth state monitoring section 21 starts its operation in synchronization with a start signal $S_T'$ output from the central control unit 14. Further, when the carrier rollers 1a, 2a are started to carry out reverse rotation in synchronization with the start signal $S_T'$, the sixth monitoring section 21 monitors whether or not the detection signal $S_{PSW}$, from the side switch is changed from the OFF level to the ON level, and when the change to the ON level is detected, the sixth state monitoring section 21 issues an instruction to start an operation to the seventh state monitoring section 22.

Thereafter, the seventh state monitoring section 22 monitors whether or not the detection signal $S_{PSW}$ from the side switch PSW is changed again from the ON level to the OFF level, and when the change to the OFF level is detected, it issues an instruction to start an operation to the eighth state monitoring section 23.

Thereafter, when the eighth state monitoring section 23 detects that the detection signal $S_{P2}$ from the second optical detector P2 has been changed from the CLOSE level to the OPEN level, it determines that the rear end of the disc DS is out of contact, followed by supplying a brake control signal $S_{BK}'$ to the central control unit 14 in order to terminate the operation of the driving motor 13. Then, the carrier rollers 1a, 2a are stopped while receiving an inertial force, and finally they are stopped with one end of the disc DS retained therebetween. As a result, even if the carrier mechanisms of the reproducing apparatus according to the present invention is of a slot-in type as, the disc DS can be ejected without being slipped out of the disc insertion port.

Further, the eighth state monitoring section 23 supplies a termination signal $S_{AK2}$ to the timeout monitoring section 27 to indicate that the carrier rollers 1a, 2a are stopped.

When the instruction to carry out the unloading is provided by the user, the timeout monitoring section 27 starts to measure a time period in synchronization with the start signal $S_T'$ supplied from the central control unit 14. If the timeout monitoring section 27 receives the termination signal $S_{AK2}$ within a predetermined third timeout period of 8 sec, the timeout monitoring section 27 determines that the unloading is carried out normally, followed by issuing a notification of the normal unloading to the central control unit 14. On the other hand, if the section 27 does not receive the termination signal $S_{AK2}$ within the predetermined third timeout period of 8 sec, it issues a notification that the carrier rollers 1a, 2a should be stopped, to the central control unit 14. In this manner, by forcibly stopping the carrier rollers 1a, 2a, occurrence of an accident, such as presence of a foreign matter in the apparatus can be prevented beforehand.

When the user pulls the disc DS out of the disc insertion port, the detection signal $S_{P1}$ output from the first optical detector P1 is changed from the CLOSE level to the OPEN level. Upon detection of the change of the detection signal $S_{P1}$, the ninth state monitoring section 24 determines that ejection of the disc DS has been finally completed, followed by output of a completion signal $S_{OK}$ to the central control unit 14.

Figure 7:
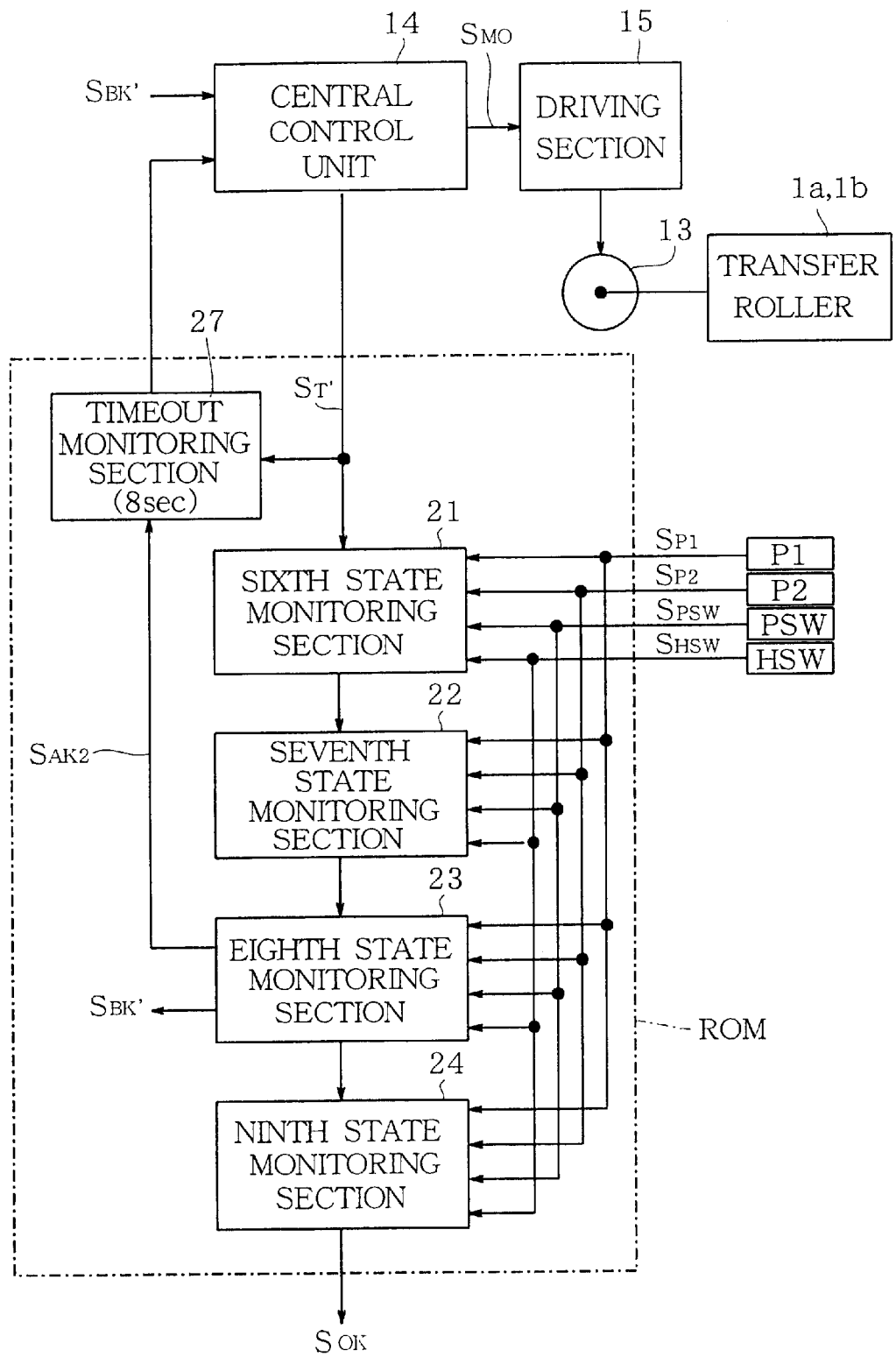
FIG. 7 is a block diagram showing the arrangement of the control circuit for controlling the operation of the carrier mechanisms during ejection of the disc.
Figure 12:
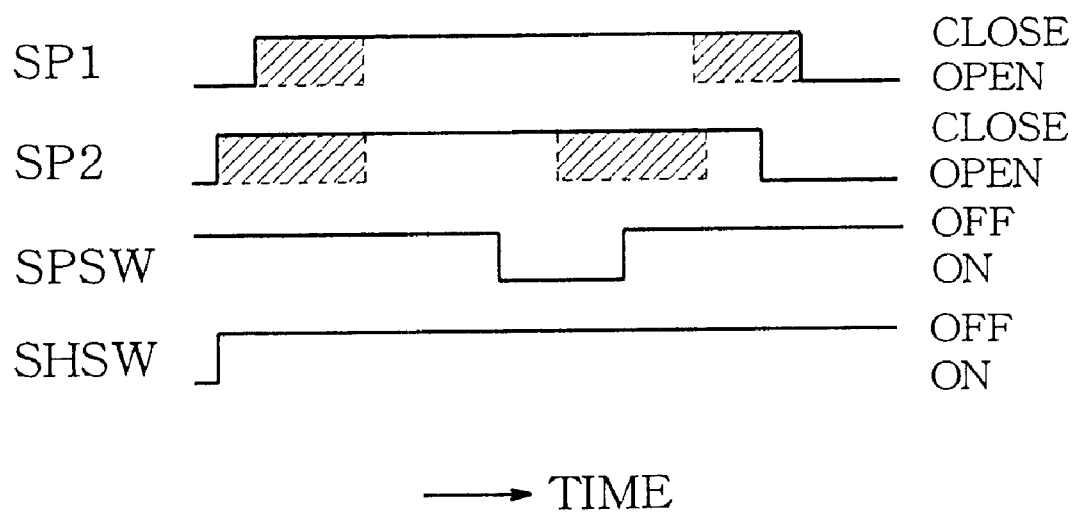
FIG. 12 is a timing chart showing changes in the detection signals during ejection of the disc.
Figure 13:
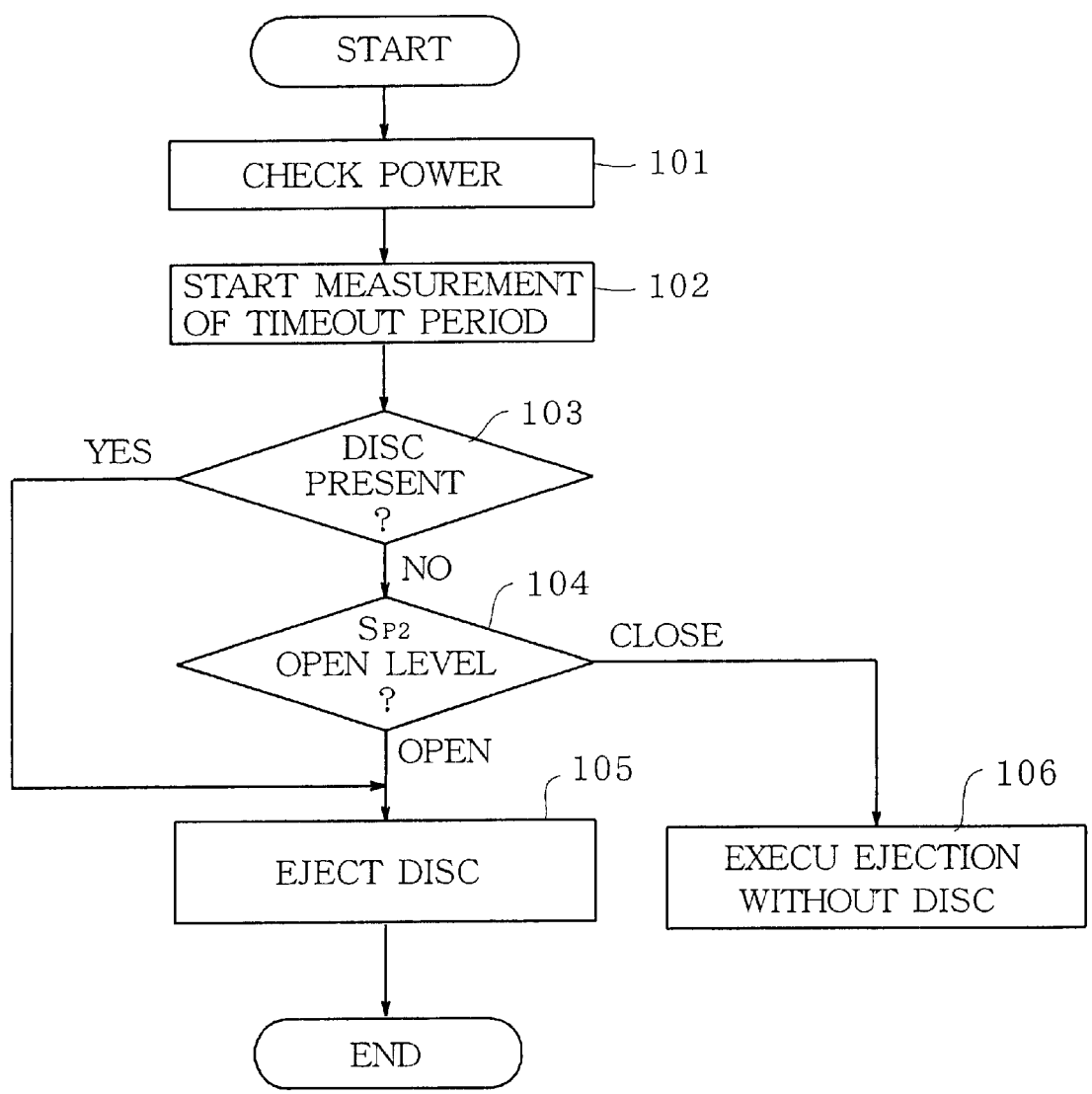
FIG. 13 is a flowchart showing a program for carrying out ejection control of the control circuit of FIG. 7.
Figure 14:
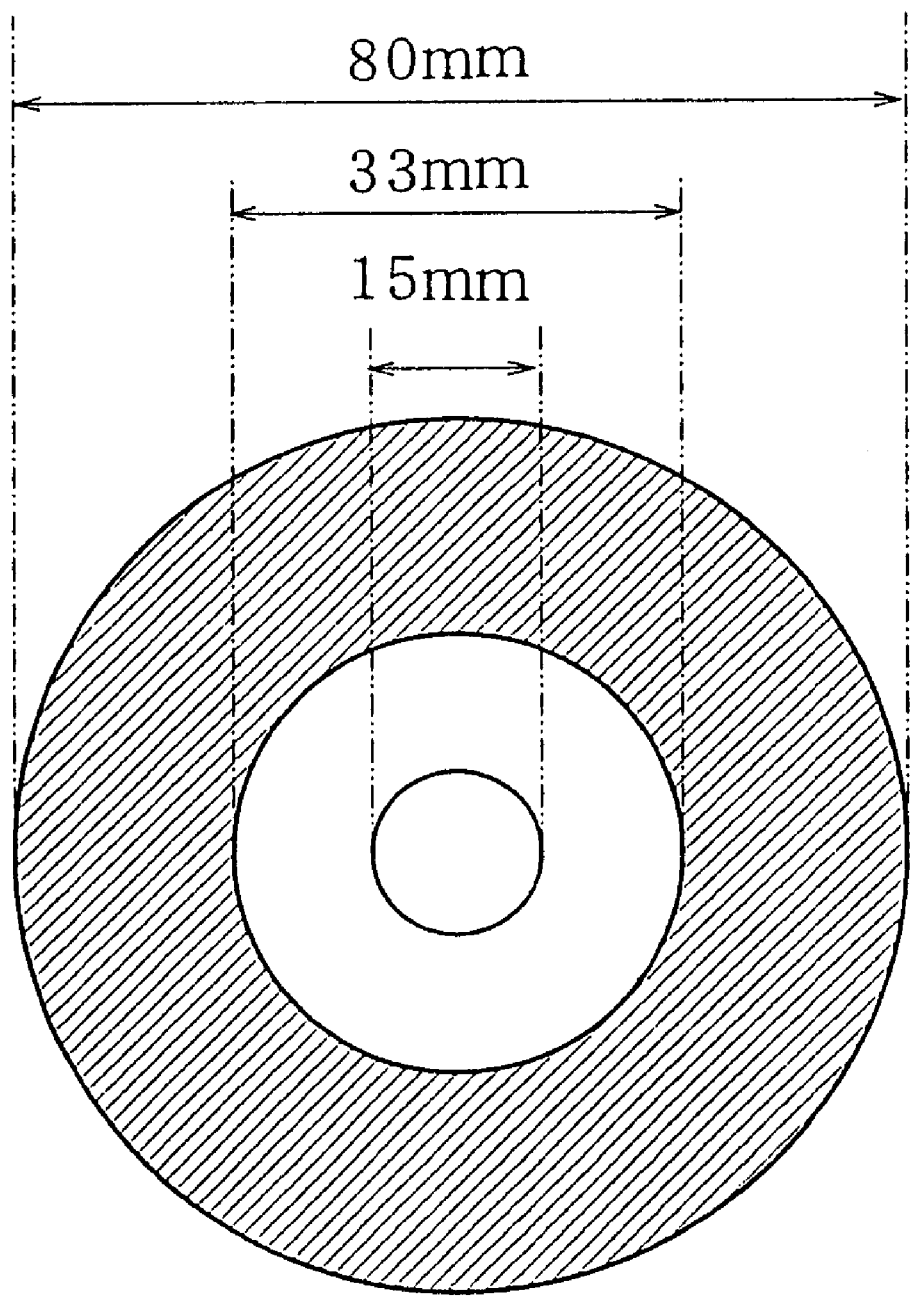
FIG. 14 is a plan view showing the format of the 8-cm diameter disc.
Figure 15:
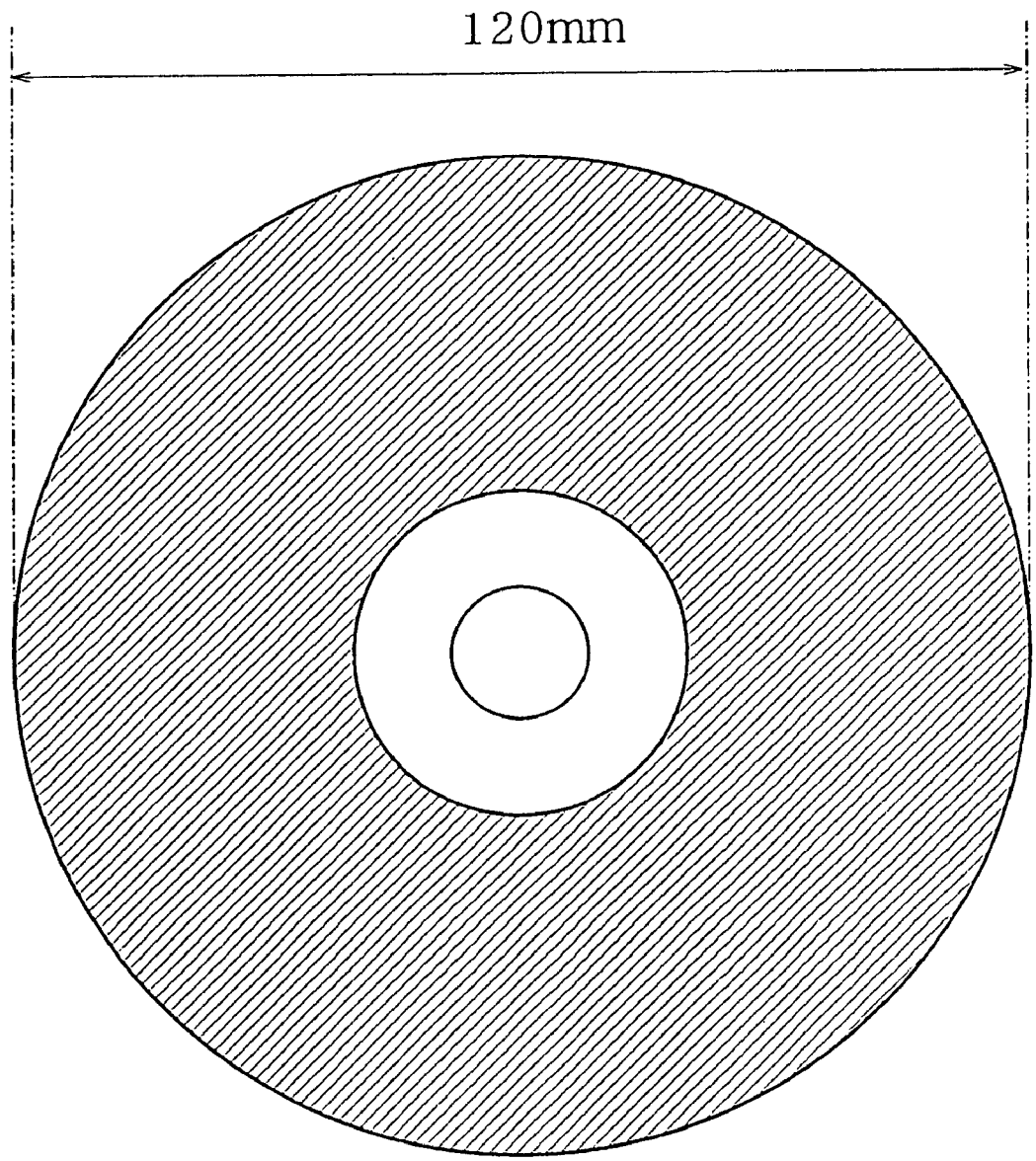
FIG. 15 is a plan view showing the format of the 12-cm diameter disc.
Figure 16:
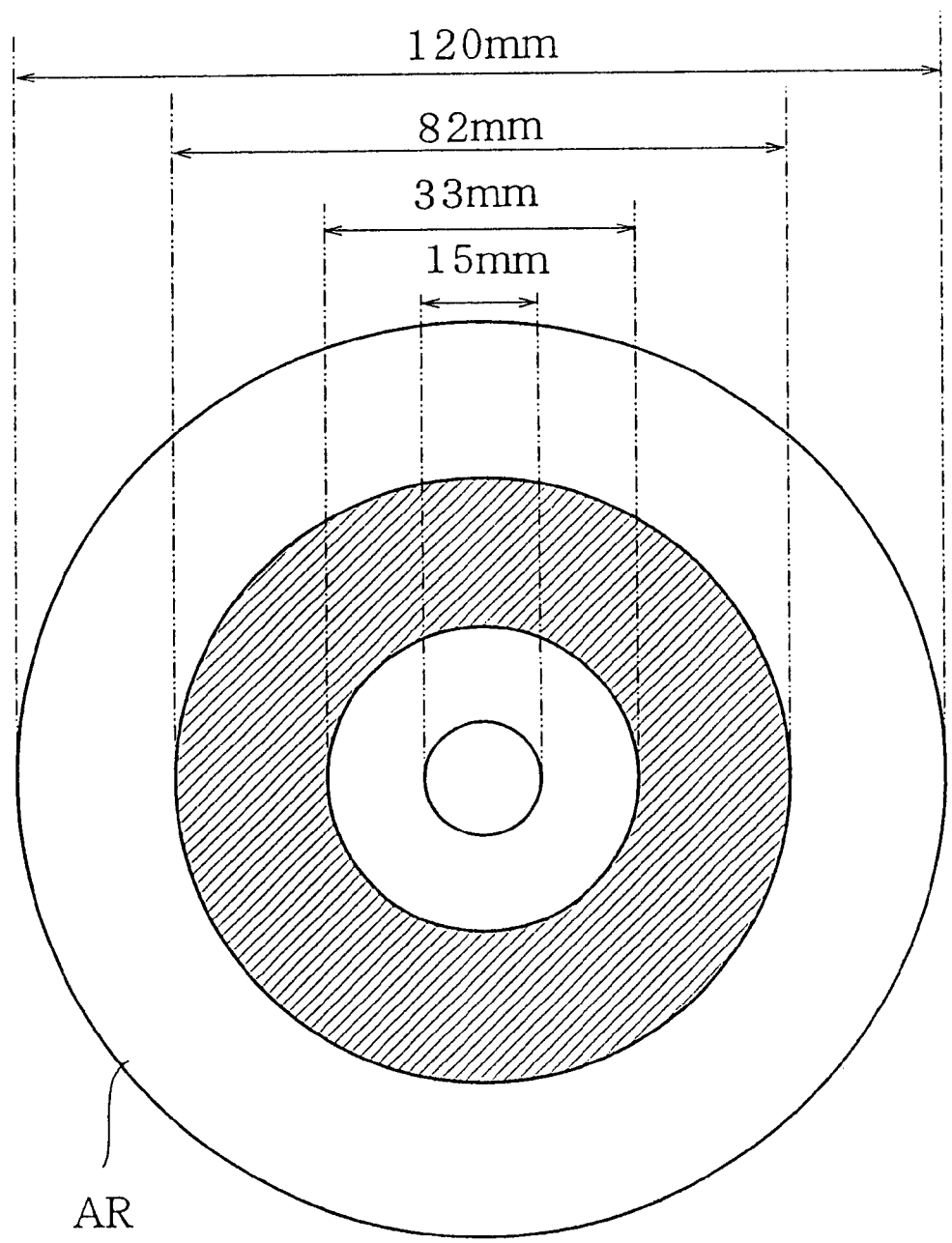
FIG. 16 is a plan view showing the format of the Maxi single disc.
Figure 17:
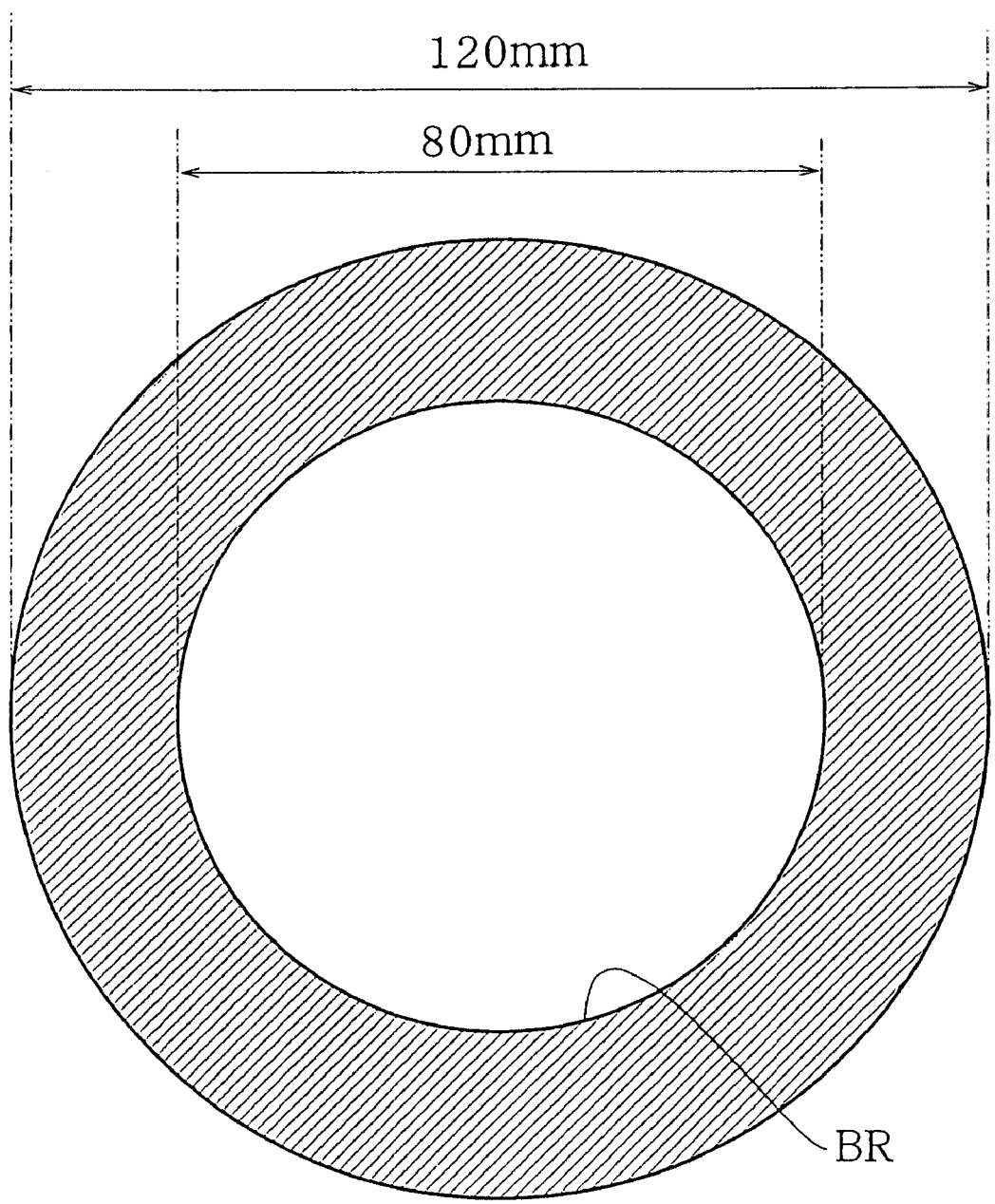
FIG. 17 is a plan view showing the shape of the adapter.

Next, the unloading operation of the control circuit of FIG. 7 will be more specifically described according to a timing chart shown in FIG. 12 and a flowchart shown in FIG. 13.

FIG. 13 shows the operation of the central control unit 14 executed before the operations of the sixth to ninth state monitoring sections 21 to 24 are started.

First, at a step 101 in FIG. 13, it is checked whether or not a power circuit, not shown, for supplying electric power to the first and second optical detectors P1, P2 are stable. If the power circuit is stable, then measurement of the time period is started at the timeout monitoring section 27, at a step 102.

Next, a memory preset in the central control unit 14, which stores a state of disc accommodation, is referred to, and then it is determined at a step 103 whether or not the disc DS is accommodated in the accommodating tray 12. If the disc DS is not present, then it is determined at a step 104 whether or not the detection signal $S_{P2}$ from the second optical detector P2 is in the OPEN level. If the detection signal $S_{P2}$ is in the CLOSE level, the program proceeds to a step 105, wherein the carrier rollers 1a, 2a are started to carry out reverse rotation, followed by execution of the unloading of the disc DS under monitoring by the sixth to ninth state monitoring sections 21 to 24, as shown in FIG. 7.

On the other hand, if it is determined at the step 104 that the detection signal $S_{P2}$ is in the OPEN level, the program proceeds to a step 106. Then, the carrier rollers 1a, 2a are forced to carry out reverse rotation over a predetermined time period without presence of the disc DS, followed by being held on standby.

On the other hand, if it is determined at the step 103 that the disc DS is present, the program skips to the step 105, wherein the above-mentioned unloading process is executed.

When the unloading process of the step 105 is started, the detection signals $S_{P1}$, $S_{P2}$, $S_{PSW}$, $S_{HSW}$ from the first and second photo sensors P1, P2, the side switch PSW, and the home switch HSW, respectively, are changed in a manner shown in the timing chart of FIG. 12.

In this manner, the control circuit of FIG. 7 carries out the monitoring, based on the detection signals $S_{P1}$, $S_{P2}$, $S_{PSW}$, $S_{HSW}$, and therefore the unloading operation is carried out normally.

As described hereinabove, according to the information reproducing apparatus of the present embodiment, installation and ejection of the disc DS and the adapter are controlled based on the detection signals $S_{P1}$, $S_{P2}$, $S_{PSW}$, $S_{HSW}$ output from the first and second optical detectors P1, P2, the side switch PSW, and the home switch HSW, respectively, a real disc can be installed and ejected in a correct manner without fail. Further, if the adapter alone or a foreign matter is inserted, it can be forcibly ejected, which leads to enhanced reliability of the information reproducing apparatus of the present invention.

In the above embodiment, the 8-cm diameter disc DS is forcibly ejected, but this is not limitative. Alternatively, according to a variation of the present embodiment, the information reproducing apparatus may be configured so as to accept and install the 8-cm diameter disc DS.

In this variation, when the 8-cm diameter disc DS is inserted from the disc insertion port toward the carrier rollers 1a, 2a, the detection signal $S_{PSW}$ from the side switch PSW always assumes the OFF level during the delivery of the disc DS, as shown in FIG. 11. On the other hand, the first optical detector P1 detects the leading end and the rear end of the 8-cm diameter disc DS, and therefore its detection signal $S_{P1}$ is changed once from the OPEN level to the CLOSE level, and then inverted again from the CLOSE level to the OPEN level.

Accordingly, the first state monitoring section 16 determines that the 8-cm diameter disc DS alone is inserted when the second inversion of the detection signal $S_{P1}$ from the CLOSE level to the OPEN level has occurred while the detection signal $S_{PSW}$ remaining in the OFF level.

Further, to cope with insertion of the 8-cm diameter disc DS in a fashion being out of alignment with the center of the disc insertion port, a mechanism for placing the 8-cm diameter disc DS at the center of the carrier rollers 1a, 2a, i.e. for centering the disc between the carrier rollers is provided The centering mechanism is realized, for example, by providing biasing members on both sides of the disc guide at a location between the disc insertion port and the disc carrier rollers 1a, 2a. The biasing members function to elastically bias side edges of the disc DS irrespective of disc size in diameter, with a force which does not hinder the disc DS from passing therethrough. By virtue of the elastically biasing force, the disc can be positioned at the center of the carriage path irrespective of its type.

In addition, to accommodate the disc DS carried by the carrier rollers 1a, 2a to the predetermined clamping position, a well-known positioning member may be provided. By virtue of this positioning member, any of the 8-cm diameter disc DS, the 12-cm diameter disc DS, the Maxi single disc DS, and the adapter mounting therein the 8-cm diameter disc can be positioned at the predetermined clamping position.

In the above described embodiments, the first and second optical detectors P1, P2, the side switch PSW, and the home switch HSW are arranged, and therefore positive loading and unloading are carried out by the carrier mechanisms 1, 2. Alternatively, a mechanically fallable type switch SWn may be arranged in addition to the optical detectors P1 and P2, as shown in FIG. 4, on one side of the carrier rollers 1a, 2a closer to the front panel and at the center between the same. Thus, the carrier rollers 1a, 2a may be started to rotate forward upon as soon as the switch SWn detect the contact of the disc DS with the fallable type switch SWn.

According to this arrangement, the carrier rollers 1a, 2a are started to perform forward rotation as soon as the leading end of each disc DS comes in contact with the fallable type switch SWn, and therefore the rollers can smoothly and positively carry out the loading of the disc DS. Especially, if the Maxi single disc DS has the transparent outer periphery AR, the peripheral edge of the Maxi single disc DS is detected not optically but mechanically, which leads to positive loading of the disc.

Further, as shown in FIG. 4, an optical detector Pn may be additionally arranged on one side of the carrier rollers 1a, 2a closer to the front panel such that an interval between the optical detector Pn and each carrier roller 1a, 2a may be larger than a radial width of the outside peripheral area AR of the Maxi single disc DS.

In this arrangement, prior to insertion of the Maxi single disc DS between the carrier rollers 1a, 2a, the optical detector Pn can detect the program area of the Maxi single disc DS, to thereby carry out the forward rotation of the carrier rollers 1a, 2a. As a result, the loading of the Maxi single disc DS can be positively carried out by the carrier rollers 1a, 2a irrespective of the transparency or opacity of the outer peripheral area AR, whereby the Maxi single disc DS can be positively carried to the predetermined clamping position.

In addition, when information is reproduced by the optical pickup mechanism 4 and the clamping mechanism 3, an initial rotational force of the turntable may be controlled in a variable manner depending on the types of the discs DS borne by the bearing surface 12b of the accommodating tray 12, based on a result of the determination as to the types of the discs. More specifically, when information recorded on the 12-cm diameter disc DS having a large weight or information on the adapter mounting therein the 8-cm diameter disc DS is to be reproduced, the initial rotational force may be set to a larger value, based on the determination result, while when information on the 8-cm diameter disc DS is to be reproduced, the initial rotational force may be set to a smaller value, according to its small weight. By virtue of this setting, a time period required for the disc DS to reach a reproducible linear scanning speed can be set to an almost equal value irrespective of the types of the disc DS etc.

Although in the present embodiment, the carrier rollers 1a, 2a are rotated in synchronization with the timing at which the user provides an instruction to insert the disc DS, this it not limitative. Alternatively, the carrier rollers 1a, 2a may be rotated upon detection of the leading end of the disc DS by means of the first optical detector P1 arranged at the frontward location of the carrier rollers 1a, 2a. In this setting as well, the carrier rollers 1a, 2a are started to carry out the loading in a manner pulling the disc DS, and therefore a so-called slot-in type information reproducing apparatus can be realized.

In the present embodiment, the description has been made of an information reproducing apparatus with a so-called auto-changer mechanism, but this is not limitative. Alternatively, the invention may be applicable to an information reproducing apparatus which can accommodate a single disc.

As described hereinabove, according to an information recording-reproducing apparatus of the invention, first and second optical detectors, and a mechanical detector are arranged in a carriage path of the apparatus so as to conform to the shapes and formats of a large diameter recording medium and a small diameter recording medium. Therefore, each recording medium can be discriminated from the other, based on detection signals output from the detectors. Further, a foreign matter other than the real recording medium can be discriminated. As a result, the information recording-reproducing apparatus can carry out recording and/or reproduction of the real recording medium irrespective of their shapes and formats, which leads to enhanced reliability of the apparatus.

Further, the information recording-reproducing apparatus of the invention is comprised of a central control unit which outputs a control signal to carrier mechanisms in order to carry out an ejecting operation or a stopping operation.

Therefore, when a foreign matter other than the real recording medium or the like is inserted into the apparatus, the foreign matter is ejected out of the apparatus, and the carrier mechanisms are stopped. As a result, the apparatus can be prevented from being damaged, leading to enhanced reliability.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An information recording-reproducing apparatus for carrying and installing a large diameter disc-type recording medium and a small diameter disc-type recording medium, including a carriage path, and carrier means for carrying said recording medium along said carriage path, said information recording-reproducing apparatus comprising:
  optical detecting means arranged in said carriage path at one location close to said carrier means, for optically detecting said recording medium when said recording medium passes through said location;
  mechanical detecting means arranged in said carriage path at another location close to said carrier means and outside said optical detecting means with respect to a center of said carriage path, for mechanically contacting with and detecting said recording medium when said recording medium passes through said another location; and
  determining means for determining whether an inserted object is said large diameter disc-type recording medium, a small diameter disc-type recording medium, or an object not to be installed, based on detection signals output from said optical detecting means and said mechanical detecting means.

2. An information recording-reproducing apparatus according to claim 1, wherein said carriage path has a width almost equal to a diameter of said large diameter recording medium, said mechanical detecting means being arranged at one peripheral end of said carriage path.

3. An information recording-reproducing apparatus according to claim 2, wherein said optical detecting means are comprised of a first optical detector and a second optical detector, said first optical detector and said second optical detector being arranged at an interval smaller than a diameter of said small diameter recording medium, said first optical detector and said mechanical detecting means being arranged at an interval larger than said diameter of said small diameter recording medium, said second optical detector and said mechanical detecting means being arranged at an interval smaller than said diameter of said small diameter recording medium.

4. An information recording-reproducing apparatus according claim 1, further comprising control means for controlling said carrier means, wherein said control means output a control signal for instructing an ejecting operation to said carrier means when said determining means determine that said inserted object is said object not to be installed, said carrier means performing said ejecting operation in response to said control signal.

5. An information recording-reproducing apparatus according to claim 4, wherein said control means output said control signal when said determination means determine that said inserted object is said small diameter recording medium.

6. An information recording-reproducing apparatus according to claim 4 or 5, further comprising accommodating position detecting means arranged at a predetermined location of a destination of said carriage path, for detecting whether said recording medium has arrived at a predetermined accommodating position and outputting a detection signal in response to the detection of the arrival of said recording medium, wherein said control means output said control signal when said detection signal is not output from said accommodating position detecting means within a predetermined time period from the time at least one of said detection signal output from said optical detecting means and said detection signal output from said mechanical detecting means in response to passing of said recording medium through said carriage path.

7. An information recording-reproducing apparatus according to claim 1, wherein said small diameter recording medium is a 8-cm diameter disc while said large diameter recording medium is a 12-cm diameter disc.

8. An information recording-reproducing apparatus according to claim 7, wherein said determining means at least determine whether said inserted object is said 8-cm diameter disc or said 12-cm diameter disc.

9. An information recording-reproducing apparatus according to claim 8, further comprising bearing sections for bearing said recording medium, retaining sections for retaining said recording medium in cooperation with said bearing sections, a rotating mechanism for driving said bearing sections for rotation, and driving means for applying a driving force on said rotating mechanism, wherein said driving means determine intension of said driving force to be applied on said rotating mechanism, based on a result of determination by said determining means.

10. An information recording-reproducing apparatus for carrying and installing a large diameter disc-type recording medium and a small diameter disc-type recording medium, including a carriage path, and a carrier for carrying said recording medium along said carriage path, said information recording-reproducing apparatus comprising:
  optical detectors arranged in said carriage path at one location close to said carrier, for optically detecting said recording medium when said recording medium passes through said location;
  mechanical detectors arranged in said carriage path at another location close to said carrier and outside said optical detectors with respect to a center of said carriage path, for mechanically contacting with and detecting said recording medium when said recording medium passes through said another location; and
  a determining section for determining whether an inserted object is said large diameter disc-type recording medium, a small diameter disc-type recording medium, or an object not to be installed, based on detection signals output from said optical detectors and said mechanical detectors.

* * * * *